United States Patent
Smirnov et al.

(10) Patent No.: US 8,843,714 B1
(45) Date of Patent: Sep. 23, 2014

(54) WRITE PACING SIMULATION TOOL

(75) Inventors: Philipp Smirnov, St. Petersburg (RU); Gil Ratsaby, Boston, MA (US); Hagay Dagan, Framingham, MA (US); Dan Aharoni, Brookline, MA (US); Julio Colon, Northbridge, MA (US)

(73) Assignee: EMC Corporation, Hopkinton, MA (US)

( * ) Notice: Subject to any disclaimer, the term of this patent is extended or adjusted under 35 U.S.C. 154(b) by 744 days.

(21) Appl. No.: 13/065,806

(22) Filed: Mar. 30, 2011

(51) Int. Cl.
*G06F 12/00* (2006.01)

(52) U.S. Cl.
USPC ............................. 711/162; 711/100; 711/154

(58) Field of Classification Search
CPC ............ G06F 11/1446; G06F 11/1448; G06F 11/1451; G06F 11/1458; G06F 11/1461
USPC .......................... 711/100, 154, 162, 163, 170
See application file for complete search history.

(56) References Cited

U.S. PATENT DOCUMENTS

| | | | |
|---|---|---|---|
| 5,206,939 A | 4/1993 | Yanai et al. | |
| 5,537,568 A | 7/1996 | Yanai et al. | |
| 5,724,583 A * | 3/1998 | Carmon et al. | 718/100 |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,434,161 B1 * | 8/2002 | Higbee et al. | 370/413 |
| 6,594,742 B1 | 7/2003 | Ezra | |
| 7,054,883 B2 | 5/2006 | Meiri et al. | |
| 7,113,945 B1 | 9/2006 | Moreshet et al. | |
| 7,292,969 B1 | 11/2007 | Aharoni et al. | |
| 7,340,489 B2 | 3/2008 | Vishlitzky et al. | |
| 7,392,360 B1 | 6/2008 | Aharoni et al. | |
| 7,571,293 B1 | 8/2009 | LeCrone et al. | |
| 7,596,644 B2 * | 9/2009 | Yu et al. | 710/60 |
| 7,624,229 B1 | 11/2009 | Longinov | |
| 7,657,718 B1 | 2/2010 | LeCrone et al. | |
| 7,702,871 B1 | 4/2010 | Arnon et al. | |
| 7,734,884 B1 | 6/2010 | Marshak et al. | |
| 7,930,497 B2 * | 4/2011 | Crockett et al. | 711/162 |

OTHER PUBLICATIONS

"XRC Performance Monitor Installation and User's Guide," IBM TotalStorage, Nov. 2002, 90 pp.
U.S. Appl. No. 12/807,943, filed Sep. 17, 2010, Colon et al.
U.S. Appl. No. 12/924,544, filed Sep. 29, 2010, Mishra et al.

* cited by examiner

*Primary Examiner* — Tuan Thai
(74) *Attorney, Agent, or Firm* — Muirhead and Saturnelli, LLC

(57) ABSTRACT

A tool and/or other system is provided that simulates write pacing in connection with a requested operation for a storage system to allow an analysis of the effect of the requested operation on the storage system. In an embodiment, the storage system may be an RDF system operating in an asynchronous transfer mode (e.g., an SRDF/A system) and the requested operation may correspond to a snapshot copy operation of the R2 device and/or a slowdown in one of the storage devices and/or the links therebetween while the SRDF/A system is operating. The system described herein enables simulation of a storage system to take into account an effect of write pacing and may be advantageously used to anticipate and/or otherwise minimize or avoid operations at a particular time that would create undesired initiation of write pacing.

15 Claims, 21 Drawing Sheets

WRITE PACING SIMULATION TOOL

TECHNICAL FIELD

This application relates to computer storage devices, and more particularly to the field of managing and transferring data between storage devices.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

RDF allows synchronous data transfer where, after data written from a host to a primary storage device is transferred from the primary storage device to a secondary storage device using RDF, receipt is acknowledged by the secondary storage device to the primary storage device which then provides a write acknowledge back to the host. Thus, in synchronous mode, the host does not receive a write acknowledge from the primary storage device until the RDF transfer to the secondary storage device has been completed and acknowledged by the secondary storage device. A drawback to the synchronous RDF system is that the latency of each of the write operations is increased by waiting for the acknowledgement of the RDF transfer. This problem is worse when there is a long distance between the primary storage device and the secondary storage device; because of transmission delays, the time delay required for making the RDF transfer and then waiting for an acknowledgement back after the transfer is complete may be unacceptable.

One way to address the latency issue is to have the host write data to the primary storage device in asynchronous mode and have the primary storage device copy data to the secondary storage device in the background, for example, as provided by a Symmetrix Remote Data Facility/Asynchronous (SRDF/A) product by EMC Corporation. The background copy involves cycling through each of the tracks of the primary storage device sequentially and, when it is determined that a particular block has been modified since the last time that block was copied, the block is transferred from the primary storage device to the secondary storage device. Although this mechanism may attenuate the latency problem associated with synchronous and semi-synchronous data transfer modes, a difficulty still exists because there cannot be a guarantee of data consistency between the primary and secondary storage devices. If there are problems, such as a failure of the primary system, the secondary system may end up with out-of-order changes that make the data unusable.

A solution to this is disclosed in U.S. Pat. No. 7,054,883 to Meiri et al., entitled "Virtual Ordered Writes for Multiple Storage Devices" (the '883 patent), which is incorporated herein by reference. The '883 patent describes an asynchronous data replication technique where data is initially accumulated in chunks at the source. A write by a device (host) is acknowledged when the written data is placed in the chunk. The chunks are stored in the cache of the source storage device(s) prior to being transmitted to the destination storage device(s). The system described in the '883 patent has the advantage of maintaining appropriate ordering of write operations (by placing data in chunks) while still providing the host with a relatively quick acknowledgement of writes.

In instances where the host(s) occasionally write data faster than the data can be transferred from the R1 device to the R2 device and/or faster than the data can be saved at the R2 device, data may accumulate in the cache of the R1 device and/or the R2 device. When this occurs, the excess data in the cache may be handled using a spillover mechanism, such as that disclosed in U.S. Pat. No. 7,624,229 to Longinov, entitled "Spillover Slot" (the '229 patent), which is incorporated by reference herein and which is assigned to EMC Corporation, the assignee of the present application. However, if the cache becomes full or close to full, notwithstanding the presence (or not) of a spillover mechanism the asynchronous transfer operation may be terminated. This may occur even though the overall rate at which data is written may be much less than rate at which data is transferred/saved. That is, a burst of data writes may cause the cache to overflow even though the system, on average, is capable of handling the rate at which data is written.

Write pacing techniques may be used to control the pacing of host data writes to a storage system in response to changing system conditions, including burst conditions. For example, in a storage system having multiple storage devices, e.g., R1 and R2 volumes in an EMC Symmetrix and/or other RDF product, host data writes may be paced according to various system conditions, such as a backlog of data at the R1 or R2 volumes and/or an amount of lag time at one or more of the volumes between receiving the write request and servicing the write request. Write pacing techniques are further discussed elsewhere herein and reference is made to, for example, U.S. Pat. No. 7,702,871 to Arnon et al., entitled "Write pacing," which is incorporated herein by reference.

Copy operations of a storage system may include generating point-in-time or snapshot that provide stored copies of data at various points in time. For example, the remote volume (R2) of an RDF product may store snapshot copies that are accessible to a user. Products for generating and storing point-in-time snapshot copies of data are produced by EMC Corporation, such as EMC SNAP, and reference is made, for example, to U.S. Pat. No. 7,113,945 to Moreshet et al., entitled "Virtual storage device that uses volatile memory," and U.S. Pat. No. 7,340,489 to Vishlitzky et al.; entitled "Virtual storage devices," which are all incorporated herein by reference.

In some circumstances, it may be desirable to minimize and/or otherwise optimize occurrences of write pacing for a host. In such situations, it may be advantageous to know the effect of events and/or operations, such as snapshot copy operations, on the storage system in connection with assessing an impact of write pacing that may occur as a result of the event and/or operation. Accordingly, it would be desirable to provide a tool and/or other system that simulates write pacing in connection with a requested operation for a storage system, such as a snap copy operation, to allow an analysis of the effect of an event on the storage system and any resulting write pacing operations.

SUMMARY OF THE INVENTION

According to the system described herein, a method for simulating write pacing includes receiving input corresponding to at least one of: a configuration and a workload of a data storage system. Input corresponding to an event on the data storage system is received. Input corresponding to write pacing parameters of the data storage system is received. Processing of the data storage system that is required in connection with the event on the data storage system is simulated. The method further includes determining processing characteristics of a write pacing operation according to the write pacing parameters during the simulated processing of the data storage system during the event. The data storage system may include a first storage device and a second storage device, and in which the first storage device replicates data to the second storage device asynchronously. The event may include a snap copy operation being performed on the second storage device and/or other operations that may cause a slowdown in one or more of the first and second storage devices. The method may further include displaying results of the simulated processing.

According further to the system described herein, a non-transitory computer readable medium stores software for simulating write pacing. The software may include executable code that receives input corresponding to at least one of: a configuration and a workload of a data storage system. Executable code is provided that receives input corresponding to an event on the data storage system. Executable code is provided that receives input corresponding to write pacing parameters of the data storage system. Executable code is provided that simulates processing of the data storage system that is required in connection with the event on the data storage system. Executable code is provided that determines processing characteristics of a write pacing operation according to the write pacing parameters during the simulated processing of the data storage system during the event. The data storage system may include a first storage device and a second storage device, and wherein the first storage device replicates data to the second storage device asynchronously. The event may include a snap copy operation being performed on the second storage device and/or other operations that may cause a slowdown in one or more of the first and second storage devices. Executable code may be provided that displays results of the simulated processing.

According further to the system described herein, a simulation system includes a data storage system including a first storage device and a second storage device coupled to the first storage device, wherein the first storage device replicates data to the second storage device asynchronously and at least one processor that executes software stored on a computer readable medium. The processor executes the software to perform steps of: receiving input corresponding to at least one of: a configuration and a workload of the data storage system; receiving input corresponding to an event on the data storage system; receiving input corresponding to write pacing parameters of the data storage system; simulating processing of the data storage system that is required in connection with the event on the data storage system; and determining processing characteristics of a write pacing operation according to the write pacing parameters during the simulated processing of the data storage system during the event. The event may include a snap copy operation and/or other operations that may cause a slowdown in one or more of the first and second storage devices. The processor may execute the software to further perform a step of displaying results of the simulated processing.

For all of the above-noted aspects of the system, described herein, the write pacing operation may include controlling a write response time between when a write request is received and when the write request is acknowledged by the first storage device, wherein the write response time is controlled according to the write pacing parameters. The write pacing parameters may correspond to an amount of lag time between when previous write requests were acknowledged by the first storage device and when corresponding data is committed at the second storage device and/or may correspond to an backlog of data, in which the acknowledging of the write request is delayed in response to at least one of the first storage device and the second storage device having the backlog of data. A size of the backlog may be based on an amount of data in cache slots of the at least one of the first storage device and the second storage device.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
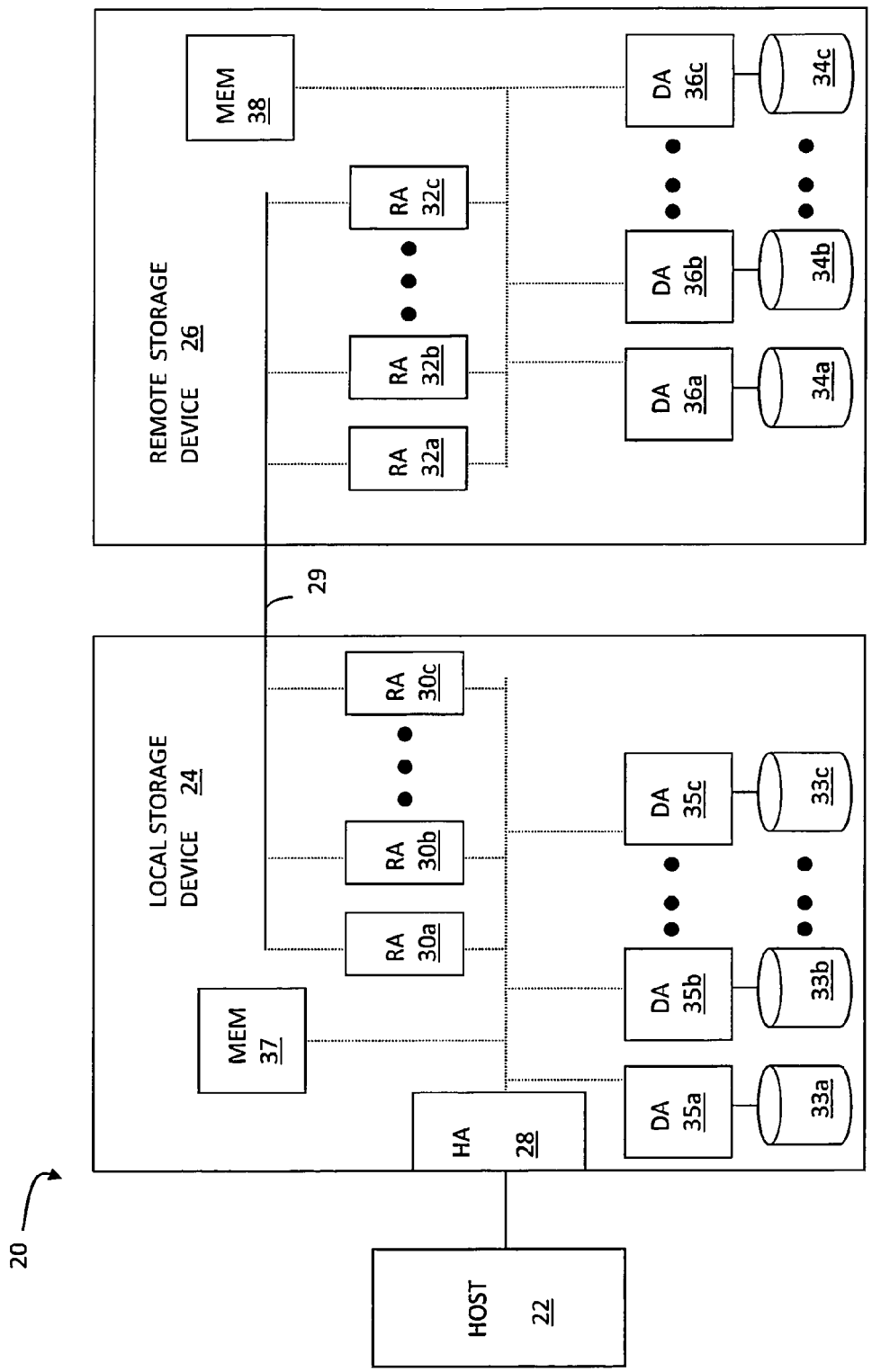
FIG. 1 is a schematic diagram showing a host, a local storage device, and a remote data storage device that may be used in connection with the system described herein.

FIG. 1 is a schematic illustration of a storage system 20 showing a relationship between a host 22, a local storage device 24 and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). Note that there may be a time delay between the transfer of data from the local storage device 24 to the remote storage device 26, so that the remote storage device 26 may, at certain points in time, contain data that is not identical to the data on the local storage device 24.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical. Communication techniques using RDF are further discussed elsewhere herein.

The storage devices 24, 26 may be provided as stand-alone devices coupled to the host 22 as shown in FIG. 1 or, alternatively, the storage devices 24, 26 may be part of a storage area network (SAN) that includes a plurality of other storage devices as well as routers, network connections, etc. The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 may include a global memory 38 that may contain tasks that are to be performed by one or more of the DA's 36a-36c and the RA's 32a-32c, and a cache for data fetched from one or more of the disks 34a-34c. Use of the memories 37, 38 is described in more detail elsewhere herein.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

For further discussion of RDF and the use thereof in communication, data recovery and storage techniques, reference is made to, for example, U.S. Pat. No. 5,742,792 to Yanai, et al., entitled "Remote data mirroring," U.S. Pat. No. 7,657,718 to LeCrone et al., entitled "Storage automated replication processing," and U.S. Pat. No. 7,734,884 to Marshak et al., entitled "Simultaneous concurrent and cascaded triangular asynchronous replication," which are all incorporated herein by reference.

Figure 2:
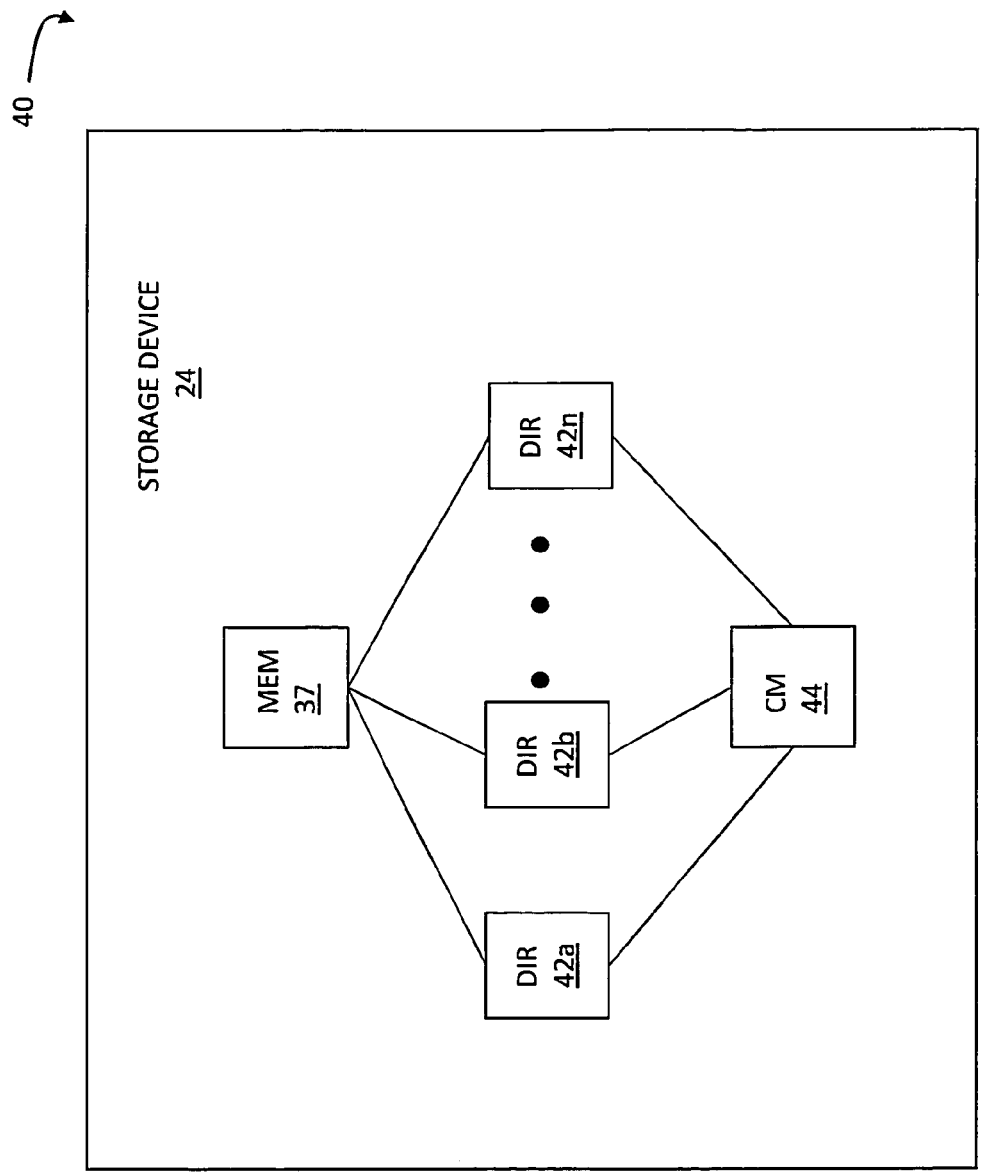
FIG. 2 is a schematic diagram showing a storage device, memory, a plurality of directors, and a communication module that may be used in connection with the system described herein.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. In an embodiment disclosed herein, there may be up to sixty-four directors coupled to the memory 37. Of course, for other embodiments, there may be a higher or lower maximum number of directors that may be used. It should be noted that the remote storage device 26 may have a similar configuration as that noted above and/or may have a different configuration, as appropriate.

The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n.

Figure 3:
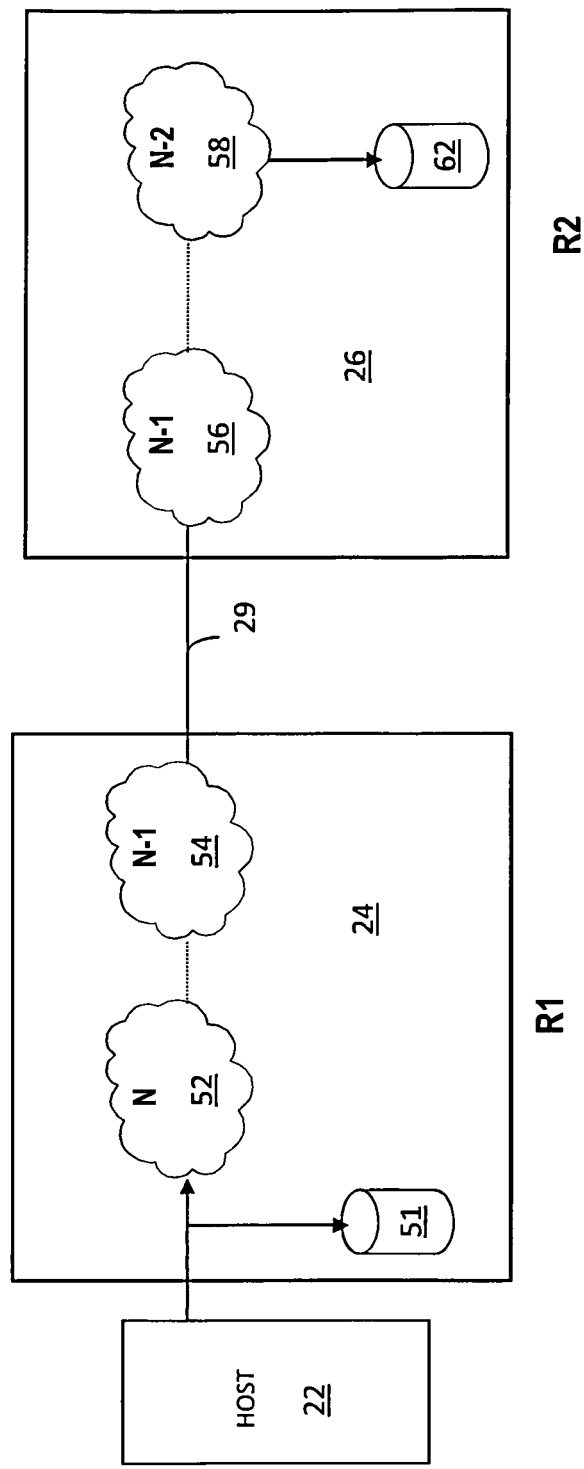
FIG. 3 is a schematic diagram showing a flow of data between a host, a local storage device, and a remote data storage device used in connection with the system described herein.

FIG. 3 is a schematic illustration showing a path of data shown from the host 22 to the local storage device 24 and the remote storage device 26. Data written from the host 22 to the local storage device 24 is stored locally, as illustrated by the data element 51 of the local storage device 24. The data that is written by the host 22 to the local storage device 24 is also maintained by the local storage device 24 in connection with being sent by the local storage device 24 to the remote storage device 26 via the link 29.

In the system described herein, each data write by the host 22 (of, for example a record, a plurality of records, a track; etc.) may be assigned a sequence number. The sequence number may be provided in an appropriate data field associated with the write. In FIG. 3, the writes by the host 22 are shown as being assigned sequence number N. All of the writes performed by the host 22 that are assigned sequence number N are collected in a single chunk of data 52. The chunk 52 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N-1) are transmitted by the local storage device 24 to the remote storage device 26 via the link 29. A chunk 54 represents writes from the host 22 that were assigned the sequence number N-1 that have not been transmitted yet to the remote storage device 26.

The remote storage device 26 receives the data from the chunk 54 corresponding to writes assigned a sequence number N-1 and constructs a new chunk 56 of host writes having sequence number N-1. The data may be transmitted using appropriate RDF protocol that acknowledges data sent across the link 29. When the remote storage device 26 has received all of the data from the chunk 54, the local storage device 24 sends a commit message to the remote storage device 26 to commit all the data assigned the N-1 sequence number corresponding to the chunk 56. Generally, once a chunk corresponding to a particular sequence number is committed, that chunk may be written to the logical storage device. This is illustrated in FIG. 3 with a chunk 58 corresponding to writes assigned sequence number N-2 (i.e., two before the current sequence number being used in connection with writes by the host 22 to the local storage device 26). The chunk 58 is shown as being written to a data element 62 representing disk storage for the remote storage device 26. Thus, the remote storage device 26 is receiving and accumulating the chunk 56 corresponding to sequence number N-1 while the chunk 58 corresponding to the previous sequence number (N-2) is being written to disk storage of the remote storage device 26 illustrated by the data element 62. In some embodiments, the data for the chunk 58 is marked for write (but not necessarily written immediately), while the data for the chunk 56 is not.

Thus, in operation, the host 22 writes data to the local storage device 24 that is stored locally in the data element 51 and is accumulated in the chunk 52. Once all of the data for a particular sequence number has been accumulated (described elsewhere herein), the local storage device 24 increments the sequence number. Data from the chunk 54 corresponding to one less than the current sequence number is transferred from the local storage device 24 to the remote storage device 26 via the link 29. The chunk 58 corresponds to data for a sequence number that was committed by the local storage device 24 sending a message to the remote storage device 26. Data from the chunk 58 is written to disk storage of the remote storage device 26.

Note that the writes within a particular one of the chunks 52, 54, 56, 58 are not necessarily ordered. However, as described in more detail elsewhere herein, every write for the chunk 58 corresponding to sequence number N-2 was begun prior to beginning any of the writes for the chunks 54, 56 corresponding to sequence number N-1. In addition, every write for the chunks 54, 56 corresponding to sequence number N-1 was begun prior to beginning any of the writes for the chunk 52 corresponding to sequence number N. Thus, in the event of a communication failure between the local storage device 24 and the remote storage device 26, the remote storage device 26 may simply finish writing the last committed chunk of data (the chunk 58 in the example of FIG. 3) and can be assured that the state of the data at the remote storage device 26 is ordered in the sense that the data element 62 contains all of the writes that were begun prior to a certain point in time and contains no writes that were begun after that point in time. Thus, R2 always contains a point in time copy of R1 and it is possible to reestablish a consistent image from the R2 device.

Figure 4:
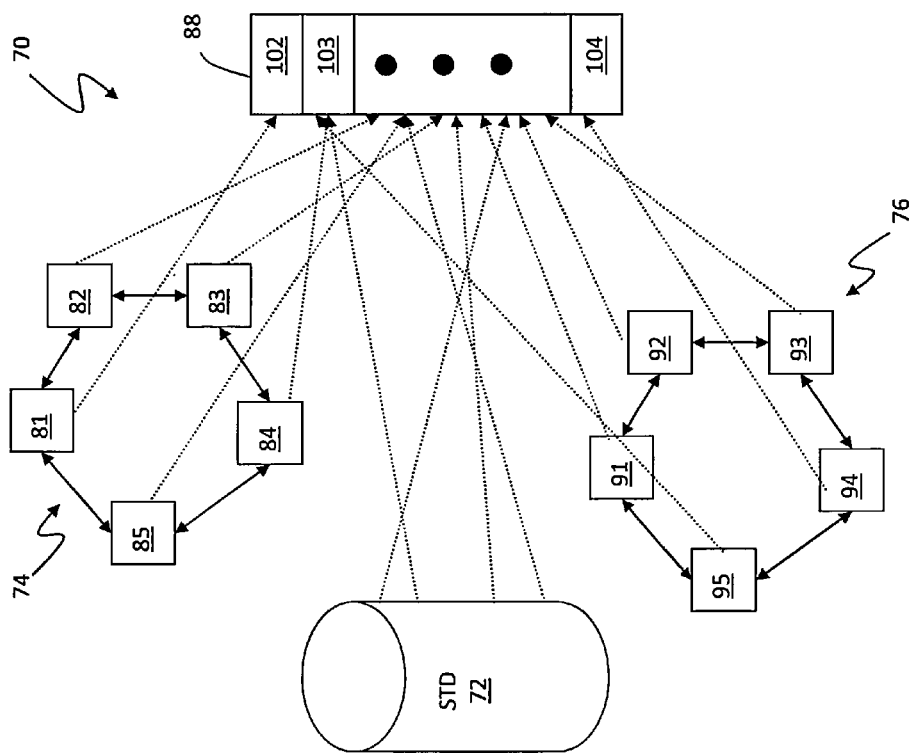
FIG. 4 is a schematic diagram illustrating items used to construct and maintain the chunks according to an embodiment of the system described herein.

FIG. 4 is a schematic diagram 70 illustrating items used to construct and maintain the chunks 52, 54 according to an embodiment of the system described herein. A standard logical device 72 contains data written by the host 22 and corresponds to the data element 51 of FIG. 3 and the disks 33a-33c of FIG. 1. The standard logical device 72 may contain data written by the host 22 to the local storage device 24.

Two linked lists of pointers 74, 76 are used in connection with the standard logical device 72. The linked lists 74, 76 correspond to data that may be stored, for example, in the memory 37 of the local storage device 24. The linked list 74 contains a plurality of pointers 81-85, each of which points to a slot of a cache 88 used in connection with the local storage device 24. Similarly, the linked list 76 contains a plurality of pointers 91-95, each of which points to a slot of the cache 88. In some embodiments, the cache 88 may be provided in the memory 37 of the local storage device 24. The cache 88 contains a plurality of cache slots 102-104 that may be used in connection to writes to the standard logical device 72 and, at the same time, used in connection with the linked lists 74, 76.

Each of the linked lists 74, 76 may be used for one of the chunks of data 52, 54 so that, for example, the linked list 74 may correspond to the chunk of data 52 for sequence number N while the linked list 76 may correspond to the chunk of data 54 for sequence number N-1. Thus, when data is written by the host 22 to the local storage device 24, the data is provided to the cache 88 and, in some cases, an appropriate pointer of the linked list 74 is created. Note that the data will not be removed from the cache 88 until the data is destaged to the standard logical device 72 and the data is also no longer pointed to by one of the pointers 81-85 of the linked list 74, as described elsewhere herein.

In an embodiment herein, one of the linked lists 74, 76 may be deemed "active" while the other is deemed "inactive". Thus, for example, when the sequence number N is even, the linked list 74 may be active while the linked list 76 is inactive. The active one of the linked lists 74, 76 handles writes from the host 22 while the inactive one of the linked lists 74, 76 corresponds to the data that is being transmitted from the local storage device 24 to the remote storage device 26.

While the data that is written by the host 22 is accumulated using the active one of the linked lists 74, 76 (for the sequence number N), the data corresponding to the inactive one of the linked lists 74, 76 (for previous sequence number N-1) is transmitted from the local storage device 24 to the remote storage device 26. The RA's 30a-30c use the linked lists 74, 76 to determine the data to transmit from the local storage device 24 to the remote storage device 26.

Once data corresponding to a particular one of the pointers in one of the linked lists 74, 76 has been transmitted to the remote storage device 26, the particular one of the pointers may be removed from the appropriate one of the linked lists 74, 76. In addition, the data may also be marked for removal from the cache 88 (i.e., the slot may be returned to a pool of slots for later, unrelated, use) provided that the data in the slot is not otherwise needed for another purpose (e.g., to be destaged to the standard logical device 72). A mechanism may be used to ensure that data is not removed from the cache 88 until all devices are no longer using the data. Such a mechanism is described, for example, in U.S. Pat. No. 5,537,568 to Yanai et al, entitled "System for dynamically controlling cache manager maintaining cache index and controlling sequential data access," and in U.S. Pat. No. 6,594,742 to Ezra, entitled "Cache management via statistically adjusted slot aging," both of which are incorporated by reference herein.

Figure 5:
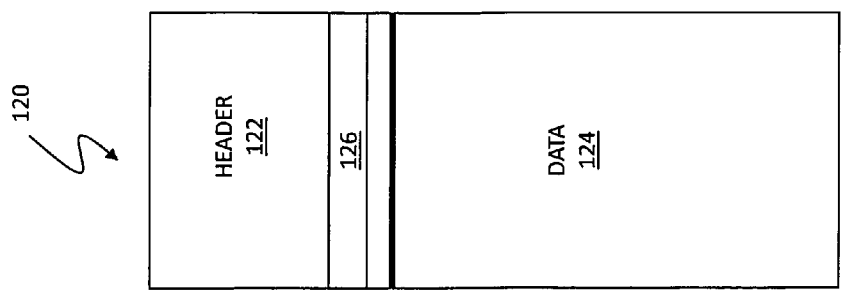
FIG. 5 is a schematic illustration showing a slot of the cache that includes a header and data according to an embodiment of the system described herein.

FIG. 5 is a schematic illustration showing a slot 120, like one of the slots 102-104 of the cache 88, includes a header 122 and data 124. The header 122 may correspond to overhead information used by the system to manage the slot 120. The data 124 may be the corresponding data from the disk that is being (temporarily) stored in the slot 120. Information in the header 122 includes pointers back to the disk, time stamp(s), etc.

The header 122 may also include a cache stamp 126 used in connection with the system described herein. In an embodiment herein, the cache stamp 126 is eight bytes. Two of the bytes are a "password" that indicates whether the slot 120 is being used by the system described herein. In other embodiments, the password may be one byte while the following byte is used for a pad. As described elsewhere herein, the two bytes of the password (or one byte, as the case may be) being equal to a particular value indicates that the slot 120 is pointed to by at least one entry of the linked lists 74, 76. The password not being equal to the particular value indicates that the slot 120 is not pointed to by an entry of the linked lists 74, 76. Use of the password is described elsewhere herein.

The cache stamp 126 also includes a two byte field indicating the sequence number (e.g., N, N-1, N-2, etc.) of the data 124 of the slot 120. As described elsewhere herein, the sequence number field of the cache stamp 126 may be used to facilitate the processing described herein. The remaining four bytes of the cache stamp 126 may be used for a pointer, as described elsewhere herein. Of course, the two bytes of the sequence number and the four bytes of the pointer are only valid when the password equals the particular value that indicates that the slot 120 is pointed to by at least one entry in one of the lists 74, 76.

Figure 6:
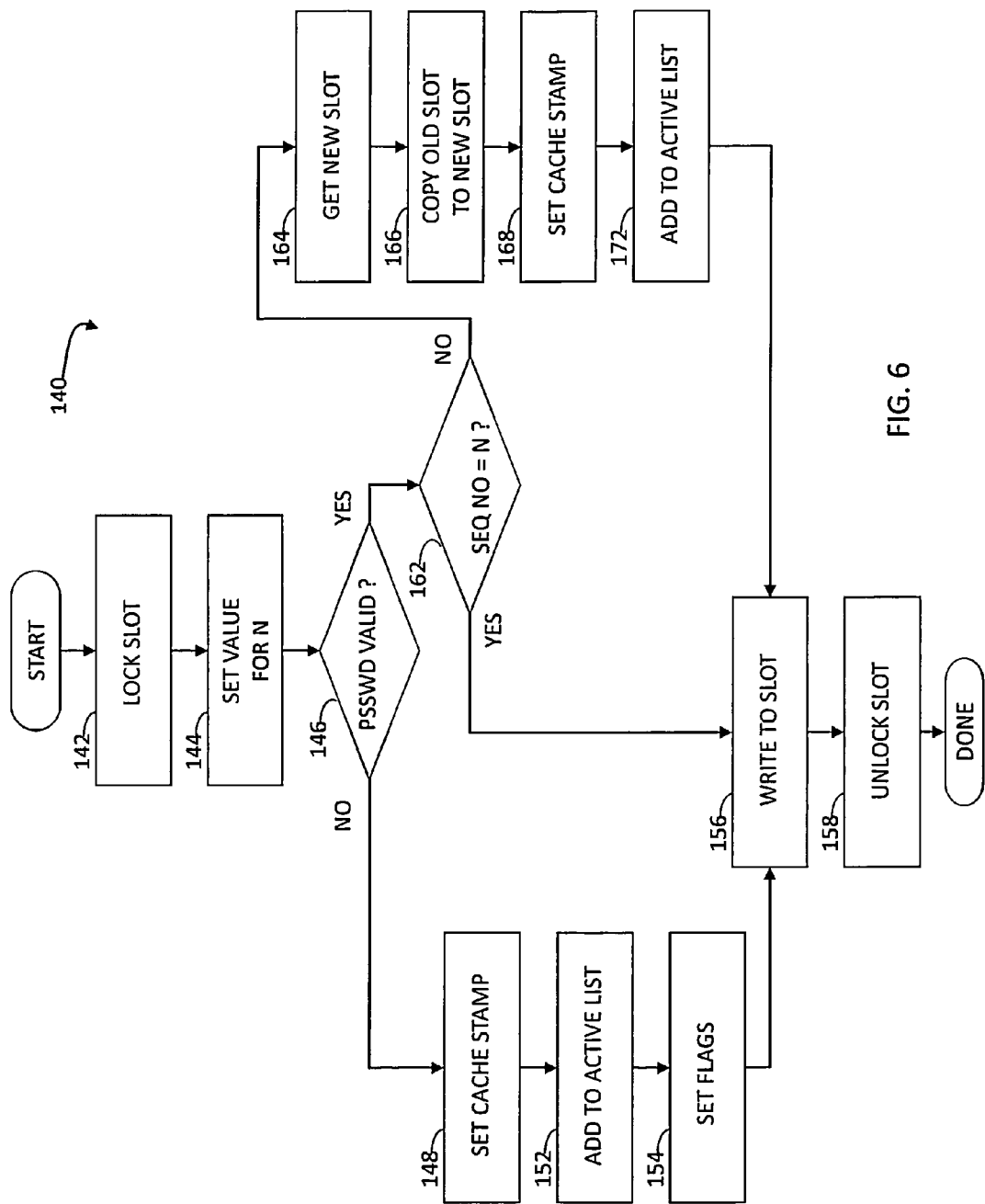
FIG. 6 is a flow chart illustrating steps performed by the HA in connection with a host performing a write operation.

FIG. 6 is a flow chart 140 illustrating steps performed by the HA 28 in connection with a host 22 performing a write operation. Of course, when the host 22 performs a write; processing occurs for handling the write in a normal fashion irrespective of whether the data is part of an R1/R2 RDF group. For example, when the host 22 writes data for a portion of the disk, the write occurs to a cache slot which is eventually destaged to the disk. The cache slot may either be a new cache slot or may be an already existing cache slot created in connection with a previous read and/or write operation to the same track.

Processing begins at a first step 142 where a slot corresponding to the write is locked. In an embodiment herein, each of the slots 102-104 of the cache 88 corresponds to a track of data on the standard logical device 72. Locking the slot at the step 142 prevents additional processes from operating on the relevant slot during the processing performed by the HA 28 corresponding to the steps of the flow chart 140.

Following step 142 is a step 144 where a value for N, the sequence number, is set. As discussed elsewhere herein, the value for the sequence number obtained at the step 144 is maintained during the entire write operation performed by the HA 28 while the slot is locked. As discussed elsewhere herein, the sequence number is assigned to each write to set the one of the chunks of data 52, 54 to which the write belongs. Writes performed by the host 22 are assigned the current sequence number. It is useful that a single write operation maintain the same sequence number throughout.

Following the step 144 is a test step 146 which determines if the password field of the cache slot is valid. As discussed above, the system described herein sets the password field to a predetermined value to indicate that the cache slot is already in one of the linked lists of pointers 74, 76. If it is determined at the test step 146 that the password field is not valid (indicating that the slot is new and that no pointers from the lists 74, 76 point to the slot), then control passes from the step 146 to a step 148, where the cache stamp of the new slot is set by setting the password to the predetermined value, setting the sequence number field to N, and setting the pointer field to Null. In other embodiments, the pointer field may be set to point to the slot itself.

Following the step 148 is a step 152 where a pointer to the new slot is added to the active one of the pointer lists 74, 76. In an embodiment herein, the lists 74, 76 are circular doubly linked lists, and the new pointer is added to the circular doubly linked list in a conventional fashion. Of course, other appropriate data structures could be used to manage the lists 74, 76. Following the step 152 is a step 154 where flags are set. At the step 154, the RDF_WP flag (RDF write pending flag) is set to indicate that the slot needs to be transmitted to the remote storage device 26 using RDF. In addition, at the step 154, the IN_CACHE flag is set to indicate that the slot needs to be destaged to the standard logical device 72. Following the step 154 is a step 156 where the data being written by the host 22 and the HA 28 is written to the slot. Following the step 156 is a step 158 where the slot is unlocked. Following step 158, processing is complete.

If it is determined at the test step 146 that the password field of the slot is valid (indicating that the slot is already pointed to by at least one pointer of the lists 74, 76), then control transfers from the step 146 to a test step 162, where it is determined whether the sequence number field of the slot is equal to the current sequence number, N. Note that there are two valid possibilities for the sequence number field of a slot with a valid password. It is possible for the sequence number field to be equal to N, the current sequence number. This occurs when the slot corresponds to a previous write with sequence number N. The other possibility is for the sequence number field to equal N-1. This occurs when the slot corresponds to a previous write with sequence number N-1. Any other value for the sequence number field is invalid. Thus, for some embodiments, it may be possible to include error/validity checking in the step 162 or possibly make error/validity checking a separate step. Such an error may be handled in any appropriate fashion, which may include providing a message to a user.

If it is determined at the step 162 that the value in the sequence number field of the slot equals the current sequence number N, then no special processing is required and control transfers from the step 162 to the step 156, discussed above, where the data is written to the slot. Otherwise, if the value of the sequence number field is N-1 (the only other valid value), then control transfers from the step 162 to a step 164 where a new slot is obtained. The new slot obtained at the step 164 may be used to store the data being written.

Following the step 164 is a step 166 where the data from the old slot is copied to the new slot that was obtained at the step 164. Note that that the copied data includes the RDF_WP flag, which should have been set at the step 154 on a previous write when the slot was first created. Following the step 166 is a step 168 where the cache stamp for the new slot is set by setting the password field to the appropriate value, setting the sequence number field to the current sequence number, N, and setting the pointer field to point to the old slot. Following the step 168 is a step 172 where a pointer to the new slot is added to the active one of the linked lists 74, 76. Following the step 172 is the step 156, discussed above, where the data is written to the slot which, in this case, is the new slot.

Figure 7:
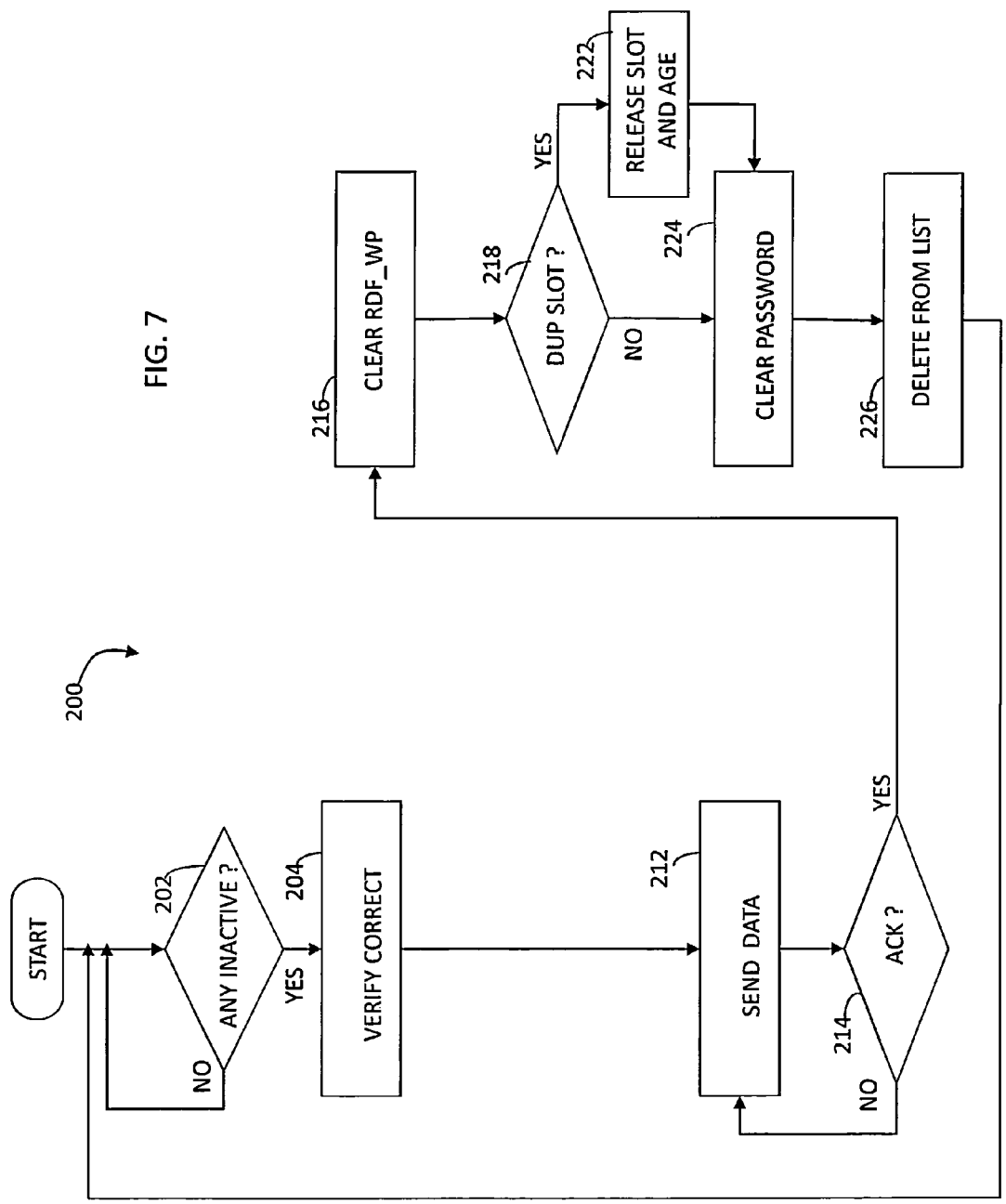
FIG. 7 is a flow chart illustrating steps performed in connection with the RA's scanning the inactive one of the lists transmit RDF data from the local storage device to the remote storage device according to an embodiment of the system described herein.

FIG. 7 is a flow chart 200 illustrating steps performed in connection with the RA's 30*a*-30*c* scanning the inactive one of the lists 72, 74 to transmit RDF data from the local storage device 24 to the remote storage device 26. As discussed above, the inactive one of the lists 72, 74 points to slots corresponding to the N-1 cycle for the R1 device when the N cycle is being written to the R1 device by the host using the active one of the lists 72, 74.

Processing begins at a first step 202 where it is determined if there are any entries in the inactive one of the lists 72, 74. As data is transmitted, the corresponding entries are removed from the inactive one of the lists 72, 74. In addition, new writes are provided to the active one of the lists 72, 74 and not generally to the inactive one of the lists 72, 74. Thus, it is possible for the inactive one of the lists 72, 74 to contain no data at certain times. If it is determined at the step 202 that there is no data to be transmitted, then the inactive one of the lists 72, 74 is continuously polled until data becomes available. Data for sending becomes available in connection with a cycle switch where the inactive one of the lists 72, 74 becomes the active one of the lists 72, 74, and vice versa.

If it is determined at the step 202 that there is data available for sending, control transfers from the step 202 to a step 204, where the slot is verified as being correct. The processing performed at the step 204 is an optional "sanity check" that may include verifying that the password field is correct and verifying that the sequence number field is correct. If there is incorrect (unexpected) data in the slot, error processing may be performed, which may include notifying a user of the error and possibly error recovery processing.

Following the step 204 is a step 212, where the data is sent via RDF in a conventional fashion. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid. Following the step 212 is a test step 214 where it is determined if the data that was transmitted has been acknowledged by the R2 device. If not, the data is resent, as indicated by the flow from the step 214 back to the step 212. In other embodiments, different and more involved processing may be used to send data and acknowledge receipt thereof. Such processing may include error reporting and alternative processing that is performed after a certain number of attempts to send the data have failed.

Once it is determined at the test step 214 that the data has been successfully sent, control passes from the step 214 to a step 216 to clear the RDF_WP flag (since the data has been successfully sent via RDF). Following the step 216 is a test step 218 where it is determined if the slot is a duplicate slot created in connection with a write to a slot already having an existing entry in the inactive one of the lists 72, 74. This possibility is discussed above in connection with the steps 162, 164, 166, 168, 172. If it is determined at the step 218 that the slot is a duplicate slot, then control passes from the step 218 to a step 222 where the slot is returned to the pool of available slots (to be reused). In addition, the slot may also be aged (or have some other appropriate mechanism applied thereto) to provide for immediate reuse ahead of other slots since the data provided in the slot is not valid for any other purpose. Following the step 222 or the step 218 if the slot is not a duplicate slot is a step 224 where the password field of the slot header is cleared so that when the slot is reused, the test at the step 146 of FIG. 6 properly classifies the slot as a new slot.

Following the step 224 is a step 226 where the entry in the inactive one of the lists 72, 74 is removed. Following the step 226, control transfers back to the step 202, discussed above, where it is determined if there are additional entries on the inactive one of the lists 72, 74 corresponding to data needing to be transferred.

Figure 8:
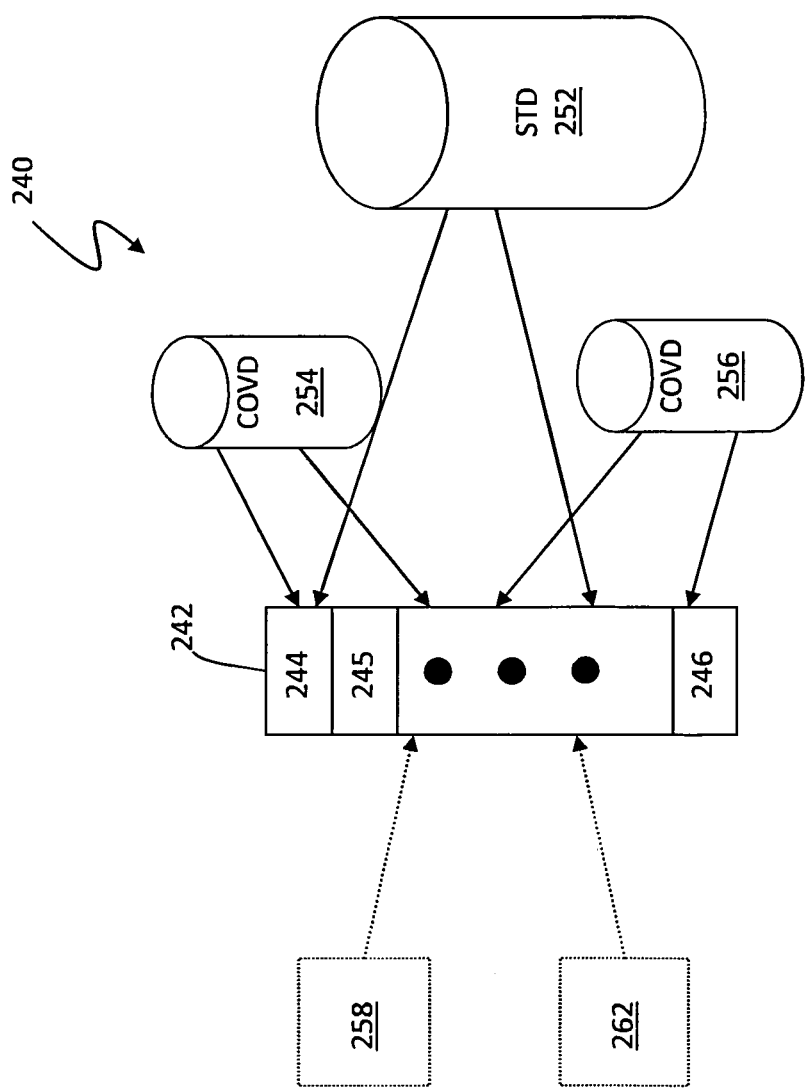
FIG. 8 is a schematic diagram that illustrates creation and manipulation of the chunks used by the remote storage device according to an embodiment of the system described herein.

FIG. 8 is a schematic diagram 240 that illustrates creation and manipulation of the chunks 56, 58 used by the remote storage device 26 according to an embodiment of the system described herein. Data that is received by the remote storage device 26, via the link 29, is provided to a cache 242 of the remote storage device 26. The cache 242 may be provided, for example, in the memory 38 of the remote storage device 26. The cache 242 includes a plurality of cache slots 244-246, each of which may be mapped to a track of a standard logical storage device 252. The cache 242 may be similar to the cache 88 of FIG. 4 and may contain data that can be destaged to the standard logical storage device 252 of the remote storage device 26. The standard logical storage device 252 may correspond to the data element 62 shown in FIG. 3 and the disks 34a-34c shown in FIG. 1.

In an embodiment, the remote storage device 26 may also contain a pair of cache only virtual devices (COVDs) 254, 256. The cache only virtual devices 254, 256 corresponded device tables that may be stored, for example, in the memory 38 of the remote storage device 26. Each track entry of the tables of each of the cache only virtual devices 254, 256 point to either a track of the standard logical device 252 or point to a slot of the cache 242. Cache only virtual devices are described in a U.S. Pat. No. 7,113,945, which is incorporated by reference herein. It should be noted that in other embodiments, other appropriate configurations of the remote storage device 26 may be used in connection with the system described herein, including configurations that do not use COVDs (see, e.g., the system shown in FIG. 4).

The plurality of cache slots 244-246 may be used in connection to writes to the standard logical device 252 and, at the same time, used in connection with the cache only virtual devices 254, 256. In an embodiment herein, each of track table entry of the cache only virtual devices 254, 256 contain a null to indicate that the data for that track is stored on a corresponding track of the standard logical device 252. Otherwise, an entry in the track table for each of the cache only virtual devices 254, 256 contains a pointer to one of the slots 244-246 in the cache 242.

Each of the cache only virtual devices 254, 256 may correspond to one of the data chunks 56, 58. Thus, for example, the cache only virtual device 254 may correspond to the data chunk 56 while the cache only virtual device 256 may correspond to the data chunk 58. In an embodiment herein, one of the cache only virtual devices 254, 256 may be deemed "active" while the other one of the cache only virtual devices 254, 256 may be deemed "inactive". The inactive one of the cache only virtual devices 254, 256 may correspond to data being received from the local storage device 24 (i.e., the chunk 56) while the active one of the cache only virtual device 254, 256 corresponds to data being restored (written) to the standard logical device 252.

Data from the local storage device 24 that is received via the link 29 may be placed in one of the slots 244-246 of the cache 242. A corresponding pointer of the inactive one of the cache only virtual devices 254, 256 may be set to point to the received data. Subsequent data having the same sequence number may be processed in a similar manner. At some point, the local storage device 24 provides a message committing all of the data sent using the same sequence number. Once the data for a particular sequence number has been committed, the inactive one of the cache only virtual devices 254, 256 becomes active and vice versa. At that point, data from the now active one of the cache only virtual devices 254, 256 is copied to the standard logical device 252 while the inactive one of the cache only virtual devices 254, 256 is used to receive new data (having a new sequence number) transmitted from the local storage device 24 to the remote storage device 26.

As data is removed from the active one of the cache only virtual devices 254, 256, the corresponding entry in the active one of the cache only virtual devices 254, 256 may be set to null. In addition, the data may also be removed from the cache 244 (i.e., the slot returned to the pool of free slots for later use) provided that the data in the slot is not otherwise needed for another purpose (e.g., to be destaged to the standard logical device 252). A mechanism may be used to ensure that data is not removed from the cache 242 until all mirrors (including the cache only virtual devices 254, 256) are no longer using the data. Such a mechanism is described, for example, in U.S. Pat. Nos. 5,537,568 and 6,594,742, both of which are incorporated by reference herein.

In some embodiments discussed elsewhere herein, the remote storage device 26 may maintain linked lists 258, 262 like the lists 74, 76 used by the local storage device 24. The lists 258, 262 may contain information that identifies the slots of the corresponding cache only virtual devices 254, 256 that have been modified, where one of the lists 258, 262 corresponds to one of the cache only virtual devices 254, 256 and the other one of the lists 258, 262 corresponds to the other one of the cache only virtual devices 254, 256. As discussed elsewhere herein, the lists 258, 262 may be used to facilitate restoring data from the cache only virtual devices 254, 256 to the standard logical device 252.

Figure 9:
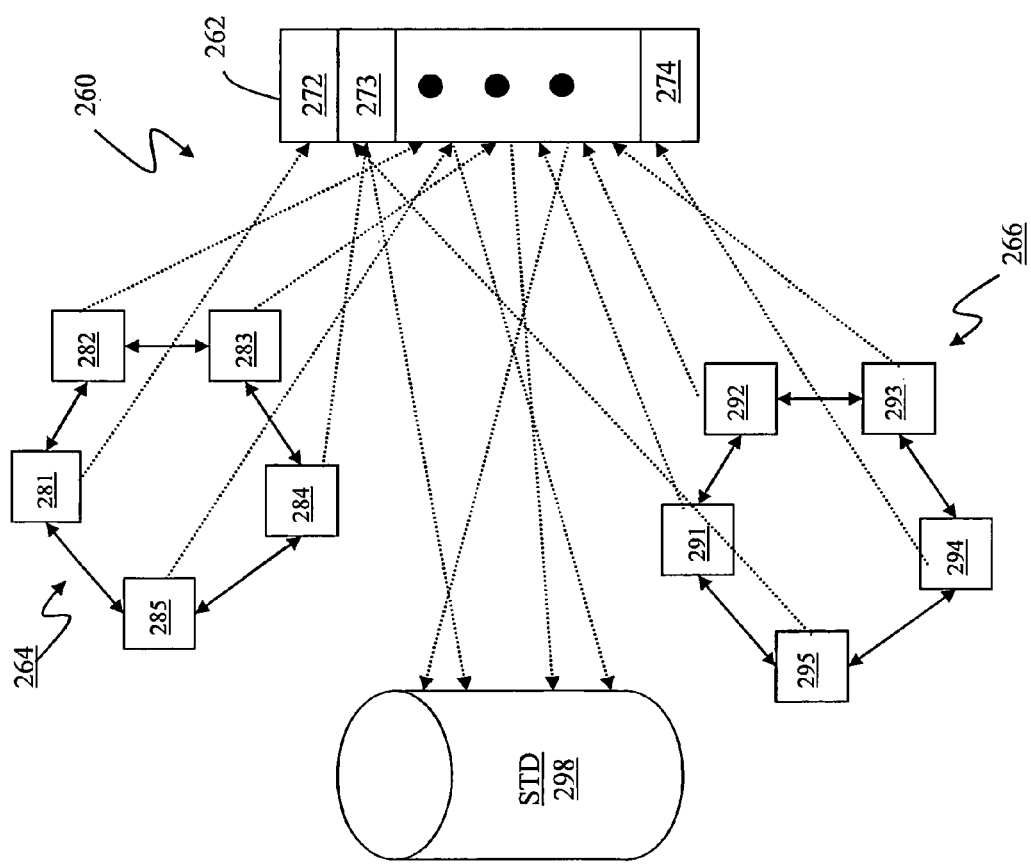
FIG. 9 is a schematic diagram showing a cache that is provided in the remote storage device that receives data according to an embodiment of the system described herein.

FIG. 9 is a schematic diagram 260 showing a cache 262 that is provided in the remote storage device 26 that receives data. The cache 262 includes a plurality of slots 272-274 in which asynchronous data that is received from the local storage device 24 is placed. Also shown is a first circularly linked list 264 and a second circularly linked list 266 which contain pointers to the slots 272-274 of the cache 262. Thus, for example, the circularly linked list 264 includes a plurality of pointers 281-285, each of which points to one of the slots 272-274 in the cache 262. Similarly, the circularly linked list 266 includes a plurality of pointers 291-295, each of which points to one of the slots 272-274 of the cache 262. A standard logical device 298 is also mapped to portions of the cache 262.

In an embodiment herein, one of the lists 264, 276 corresponds to an inactive data chunk (e.g., like the chunk 56 shown in FIG. 3), while the other one of the lists 264, 266 corresponds to an active data chunk (e.g., like the chunk 58 of FIG. 3). Received data is accumulated using an inactive one of the data chunks while the active one of the data chunks is used for storing data at the standard logical device 298 as described elsewhere herein in connection with the diagram 240 of FIG. 8 and the corresponding text. Thus, as new data arrives, it is placed in the cache 262 and a new pointer is added to which one of the circularly linked lists 264, 266 corresponds to the inactive data chunk when the data is received.

In some instances, it may be useful to be able to determine whether a portion of the standard logical device 298 (or any other logical device) has a slot associated therewith in the cache 262 corresponding to received data. Of course, it is always possible to traverse both of the lists 264, 266 to determine if there is a corresponding slot in the cache 262. However, it would be more useful if there were a way of using particular device, cylinder, and head values of a logical device to determine whether there is a corresponding one of the slots 272-274 in the cache 262 waiting to be destaged to the device.

Figure 10:
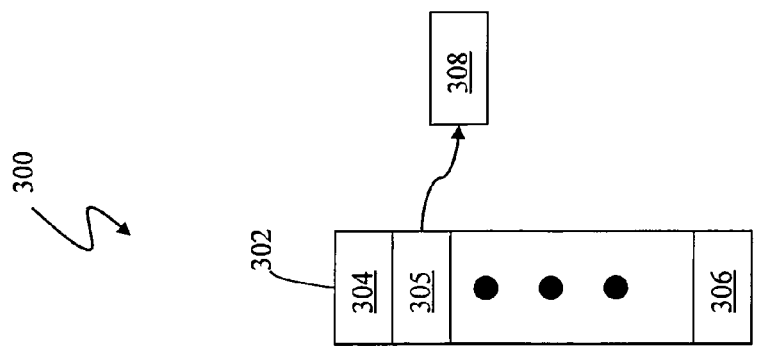
FIG. 10 is a schematic diagram showing a hash table which contain a plurality of entries according to an embodiment of the system described herein.

FIG. 10 is a schematic diagram 300 shows a hash table 302 which contain a plurality of entries 304-306. In an embodiment herein, each of the entries 304-306 either contains a null pointer or points to one of the cache slots 352-354 that correspond to data that has been received but not yet stored on the standard logical device 298 (or another standard logical device). The table 302 is indexed using a hash function that performs a mathematical operation using the particular values of the device, cylinder, and head to generate an index into the table 302 to find the corresponding entry. Thus, when data is received by the R2 device, the hash function is applied to the device, cylinder, and head to find its index value into the table 302 and then a pointer is written to the corresponding one of the entries 304-306 that points to the particular slot 272-274 in the cache 262. Once the received data is appropriately destaged to the standard logical device 298 (or another device), the corresponding one of the entries 304-306 is set to null. In this way, the hash table 302 allows quickly determining whether a particular portion of a standard logical device corresponds to received data that has not yet been destaged. For the system described herein, any appropriate hash function may be used to generate the index into the table 302.

In some instances, it may possible for a particular device, cylinder, and head values to generate an index into the table 302 that is the same as an index generated by different values for the device, cylinder, and head. This is called a "collision".

In instances where collisions occur, a second entry into the table 302 corresponding to the same index as provided and the second entry is linked to the first entry so that a particular index would correspond to more than one entry. This is illustrated by an element 308 that is linked to the element 305 of the table 302. Thus, a first device, cylinder, and head are hashed to generate and index to the entry 305 while different device, cylinder, and head are input to the hash function to generate the same value for the index. In an embodiment herein, the entry 305 is used to point to the data in the cache 262 corresponding to the first device, cylinder, and head while the entry 308 is used to point to data in the cache 262 corresponding to the second device, cylinder and head. Of course, as data is destaged to an appropriate device, the corresponding one of the entries 305, 308 may be eliminated from the table 300.

Note that any number of entries may correspond to a single index so that, for example, if collisions occur that cause three separate sets of values for device, cylinder, and head to generate the same index, then there would be three (or more) entries linked together at a particular index into the table 302. Note also that other appropriate techniques may be used to handle collisions, including providing additional tables (e.g., a second table, a third table, a fourth table, etc.) and other types and configurations of tables may be used in connection with the system described herein.

According further to the system described herein, mechanisms may be provided to pace the writing of data at the source (e.g., by a host) to prevent the cache of the R1 and/or R2 devices from becoming too full (i.e., so full as to adversely impact operation of the system). Note that the data in the cache at the R1 device may represent the backlog of data to be transmitted from the R1 device to the R2 device while the data in the R2 cache may represent the backlog of data being destaged at the R2 device. Note further that a backlog may occur both in systems that use a cache spillover mechanism (described above) and systems without a cache spillover mechanism. In an embodiment, a write pacing mechanism may be used to delay acknowledgements of writes being provided by the R1 storage device(s) to one or more host(s) coupled thereto. In many cases, host writes may be dependent so that a subsequent write is not provided until a previous write has been acknowledged by the R1 storage device(s). Thus, delaying write acknowledgements effectively delays accumulation of data in chunks at the R1 device(s) and effectively delays accumulation of data to be destaged at the R2 device(s). Write pacing may similarly be used in connection with the writing of host writes at a rate that is faster than the transfer of data over the link between R1 and R2. Any appropriate mechanism for write pacing may be used in connection with the system described herein, including one or more of the specific write pacing examples discussed in detail herein.

U.S. patent application Ser. No. 12/924,544 to Mishra et al., filed Sep. 29, 2010, entitled "Rate Control for Asynchronous Data Replication," which is incorporated by reference herein, discloses a system that provides asynchronous transfer of data in chunks while avoiding a cache overflow when data is occasionally written faster than it can be transferred/saved using write pacing systems and techniques. A first storage device (e.g., R1) may receive a first plurality of data writes that are written before a first time. A second plurality of writes are received at the first storage device that are written after the first time and before a second time. The first plurality of writes may be transferred to a second storage device (e.g., R2) while the second plurality of data writes are being written to the first storage device. The second plurality of data writes are acknowledged to the first storage device where the acknowledgment is delayed in response to either the first storage device or the second storage device having a backlog of data. Pacing data transfers may also include providing the second plurality of data writes to cache slots of the first storage device.

U.S. Pat. No. 7,702,871 to Arnon et al., entitled "Write pacing," which is incorporated herein by reference, discloses a system for controlling the pacing of host data writes in response to changing system conditions. The system allows for the use of variably controlled delays that facilitate asynchronous replication with bounded lag and smooth steady-state performance. Adding delay to the writes slows down the host and dampens activity spikes. A first storage device (e.g., R1) receives a write request, transmits data to a second storage device (e.g., R2), and acknowledges the write request. An amount of additional write response time is controlled between when the write request is received and when the write request is acknowledged by the first storage device, where the amount of additional write response time is controlled according to system parameters including an amount of lag time between when the write request is received and when the write request is committed at the second storage device.

In describing an embodiment of write pacing in connection with a discussion of the system described herein, the following terms may be used. Lag time is a measure of the time between data being written to the local storage device R1 and the data being committed to memory at the remote storage device R2 (as discussed elsewhere herein, see, for example, FIG. 3). Write Response Time (WRT) may be a measure of the time between a write being initiated by a host and the write being acknowledged to the host. A Response Time Penalty (RTP) may be an additional amount delay added to the WRT to increase the WRT. The Recovery Point Objective (RPO) may be the maximum acceptable lag time between the time data is committed to the primary storage (R1) and the time it is committed to the secondary storage (R2). In some instances, RPO may be measured in number of writes. For instance, for a host that does 1000 writes/sec, an RPO of ten seconds corresponds to RPO of 10,000 writes.

The system described herein may be implemented in connection with any data transfer mechanism between storage devices where it is possible to introduce a delay in connection with write operations to one or more of the storage devices. The system described herein, and/or a portion thereof, may be provided in connection with writing data in chunks (with or without spillover slots) as described elsewhere herein. The system described herein, and/or a portion thereof, may be implemented using a version of the SRDF/A functionality provided by EMC Corporation of Hopkinton, Mass.

Write pacing to add delay to writes by the host may be used to stabilize the steady-state operation of the system, especially in response to brief periods of increased or bursty activity conditions. As further discussed herein, a controller, such as a software component or interface, may control the amount of RTP by interfacing with a buffer between the host and the data element of the local storage device to delay writes from the host and/or delay acknowledgment to the host of a write according to the desired/acceptable value of the lag time. The amount of the delay is the RTP that is added to the WRT. Example embodiments for methods of controlling write pacing in connection with the system described herein are set forth in the following flow diagrams.

Figure 11:
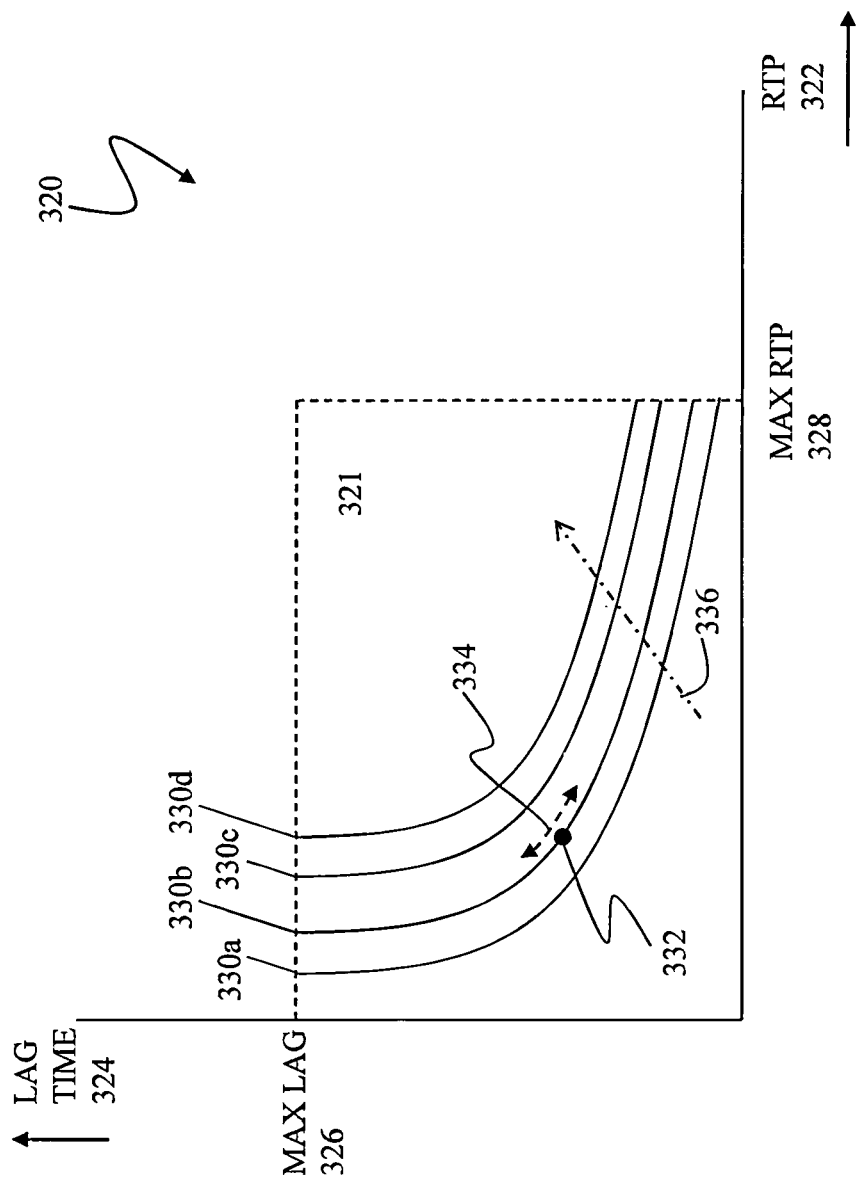
FIG. 11 is a graph showing an example of write pacing operation with RTP/delay time on the x-axis and lag time on the y-axis according to an embodiment of the system described herein.

FIG. 11 is a graph 320 showing an example of write pacing operation with RTP/delay time on the x-axis 322 and lag time on the y-axis 324 according to an embodiment of the system described herein. In an embodiment, RTP may be expressed in milliseconds and lag time measured in seconds. As illustrated, and further discussed herein, there is a trade-off between lag time and RTP. A region 321 is shown bounded by maximum lag time and maximum RTP. The maximum boundaries indicated may be the maximum values for acceptable steady-state operation of the system. For example, the maximum permissible lag time 326 may be based on the expected time to fill the buffer in R1. The maximum permissible RTP 328 may be the amount of time at which the corresponding WRT would cause a timeout on the system in the event a host write is not timely acknowledged to the host. As further discussed herein, within the region 321, user defined maximum acceptable values may allow more detailed separation of the region 321 into identifiable operational envelopes.

The graph 320 is shown with multiple contour lines 330a-330d in which each of the contour lines 330a-330d illustrates possible trade-off values between RTP and lag time for given network/storage device conditions. For a particular network/storage device condition, a given position 332 on a contour line 330b indicates a value of lag time and RTP for the position 332. Movement along the contour line 330b in a direction 334 indicates a trade-off between lag time and RTP, that is, if lag time is increased, RTP is decreased and vice versa. The multiple contour lines 330a-330d indicate that, as network/storage device conditions change, different values of RTP and lag times are obtained. For example, as network/storage device conditions deteriorate, as shown by the direction indicated with an arrow 336, the operating capability of the system decreases which is shown by the multiple contour lines 330c, 330d indicating system operation trade-offs between higher values of both lag time and RTP as compared with the contour line 330b.

Figure 12:
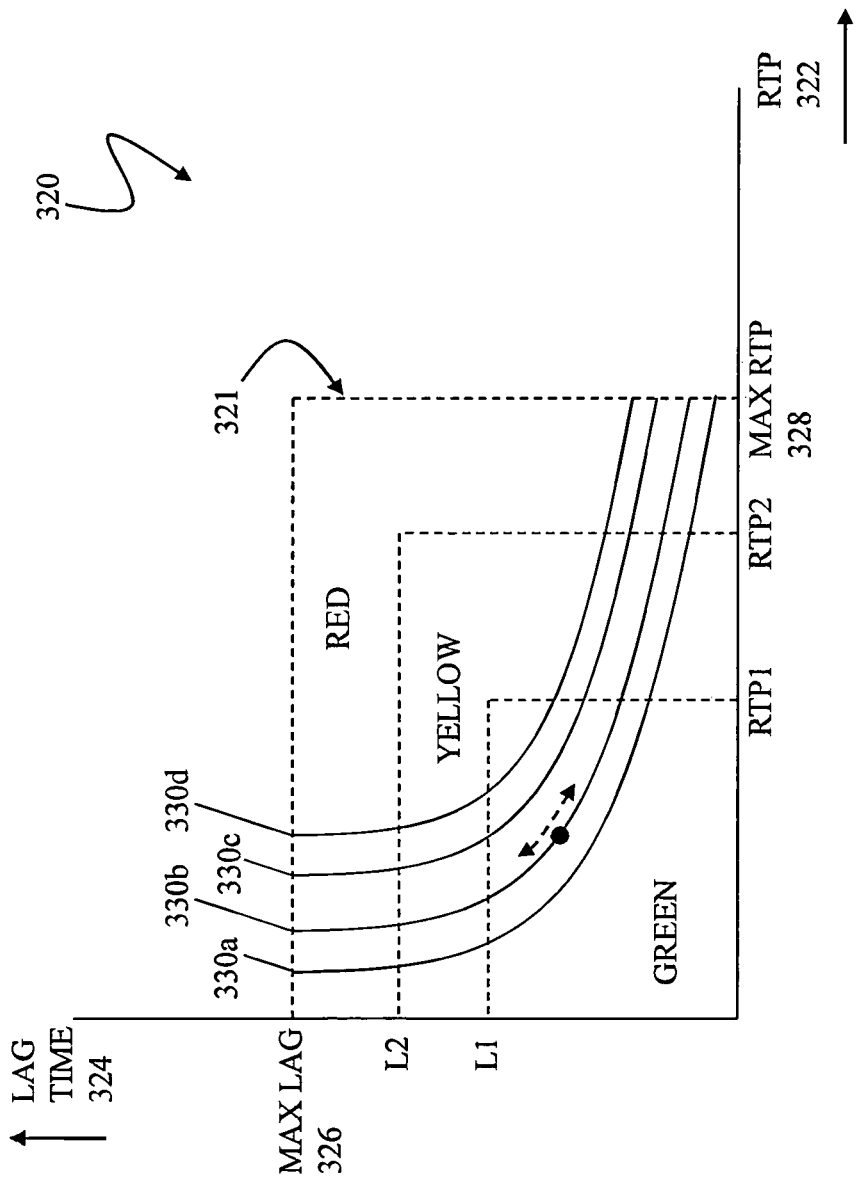
FIG. 12 schematically illustrates the graph showing an embodiment in which the maximum bounded region is divided into three operating regions or envelopes: GREEN, YELLOW and RED.

FIG. 12 schematically illustrates the graph 320 showing an embodiment in which the maximum bounded region 321 is divided into three operating regions or envelopes: GREEN, YELLOW and RED. These operational envelopes may indicate levels of system operation that may be, for example, acceptable levels and/or levels that cause initiation of notification or remedial actions in the event certain thresholds are exceeded, as further discussed herein.

The area bounded by L1 and RTP1 may form the GREEN envelope of the region 310 which the user (e.g., system administrator) defines as normal, acceptable system operation. If the levels that form the GREEN envelope are exceeded, the system operation may be in the YELLOW envelope that requires a notification to the user that the limits of desirable operation are close to being reached. The YELLOW envelope may be indicated, for example, by operation up to levels identified as L2 and RTP2. For example, the user may define an RTP2 of two milliseconds and an RPO that dictates L2 be 10 seconds for the YELLOW envelope. The L1 and RTP1 levels may be at some level lower than the L2 and RTP2 values. Beyond the RTP2 and L2 levels, the system operation may become unacceptable, for example based on system operational requirements and/or user criteria, and indicated by the RED envelope of the region 310. Other RTP and lag time parameters may be used for suitable operation of the system described herein. If system operation slips into the RED envelope, notification, and/or other actions (e.g., remedial actions) may be required, such as moving the system to another operational mode.

It should be noted that user policies may determine the parameters of the GREEN, YELLOW and RED operating envelopes. In this way, appropriate parameters may be included in service level agreements for monitoring, maintenance and other servicing of the system. For example, a user may specify in a service level agreement that normal operation of the system may include only a certain number of RED or YELLOW envelope intrusions within a certain time frame. A user may also specify what area of a GREEN operating envelope is preferred according to certain conditions. For example, during certain periods, a user may prefer operation in the GREEN envelope that promotes minimizing lag time or, alternatively, that minimizes RTP time. The system described herein provides for a practical and flexible method of managing SRDF products.

Figure 13:
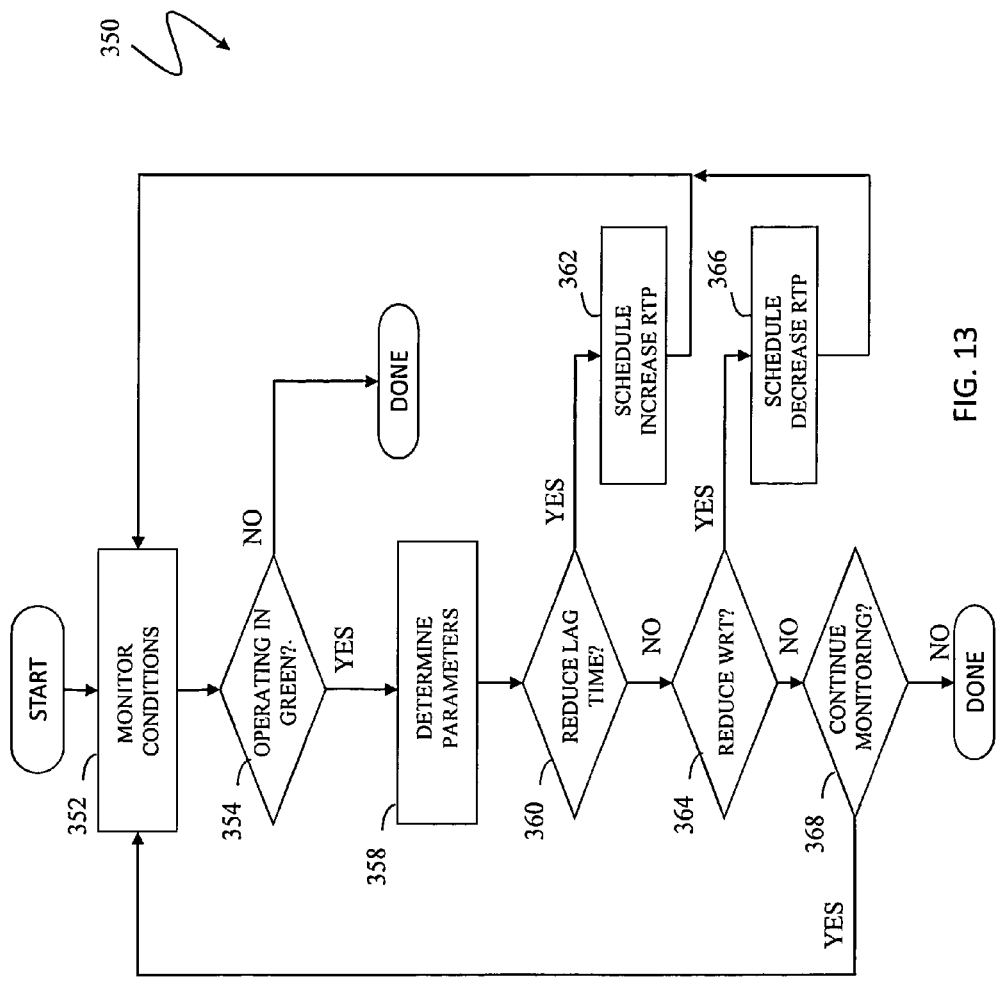
FIG. 13 is a flow diagram illustrating operational adjustment of the system described herein based on user-defined parameters when the system is in the GREEN operational envelope according to an embodiment of the system described herein.

FIG. 13 is a flow diagram 350 illustrating operational adjustment of the system described herein based on user-defined parameters when the system is in the GREEN operational envelope according to an embodiment of the system described herein. At a step 352, system conditions may be monitored, including network/storage device conditions and/or current lag times and RTP times of the system. Any appropriate mechanism (including internal system mechanisms) may be used for monitoring and analyzing network activity and conditions and/or parameters of writing to storage devices. Any appropriate external systems may also be used, including conventional systems. After the step 352, processing proceeds to a test step 354 where it is determined whether the system conditions indicate the system is operating in the GREEN condition. As further discussed elsewhere herein, the conditions for operating in the GREEN condition may be determined by a user, such as a system administrator, according to a policy. If it is determined that the system is not operating in the GREEN condition, processing is complete.

If it is determined at the test step 354 that the system is operating in the GREEN condition, processing proceeds to a step 358 where operational parameters for operation in the GREEN condition are determined. The operational parameters may be determined by the user according to a policy that may part of the same or a different policy than that described herein with respect to the step 354. The operational parameters determined at the step 358 help determine suitable operation of the system according to the needs of the user as determined by the policy. For example, the policy may specify that when operating in the GREEN condition the lag time should be minimized. Alternatively, the policy may specify that the RTP should be minimized. Other parameters may be used that establish a balance between the lag time and the RTP.

After the step 358, processing proceeds to a test step 360 where it is determined whether the parameters determined from the step 358 in comparison with the current operating conditions determined from the step 352 indicate that the lag time should be reduced (or that the RTP should be increased). If so, then processing proceeds to a step 362 where the RTP is scheduled for increase by an appropriate amount (e.g., by increasing RTP by 10%). The RTP may be then increased by a more generic process, described elsewhere herein. After the step 362, processing proceeds back to the step 352. If at the test step 360 it is determined that lag time should not be reduced, then processing proceeds to a test step 364 where it is determined if the WRT should be reduced (or the lag time should be increased). If so, then processing proceeds to a step 366 where the RTP is scheduled for decrease by an appropriate amount (e.g., by decreasing the RTP by 10% of the current value of the RTP). The RTP may be then decreased by a more generic process, described elsewhere herein. After the step 366, processing proceeds back to the step 352. Note that the test at the step 364 may not measure WRT directly, but may use other criteria, as described elsewhere herein.

If at the test step 364 it is determined that WRT should not be reduced, processing proceeds to a test step 368 where it is determined whether monitoring should be continued. If so, then processing proceeds back to the step 352. If not, then processing is complete. In an embodiment herein, the RTP may be maintained at zero (allowing minimum WRT) so long as the system operates in the GREEN zone. In such a case, the system may exhibit conventional SRDF/A behavior so long as RTP remains zero.

Figure 14:
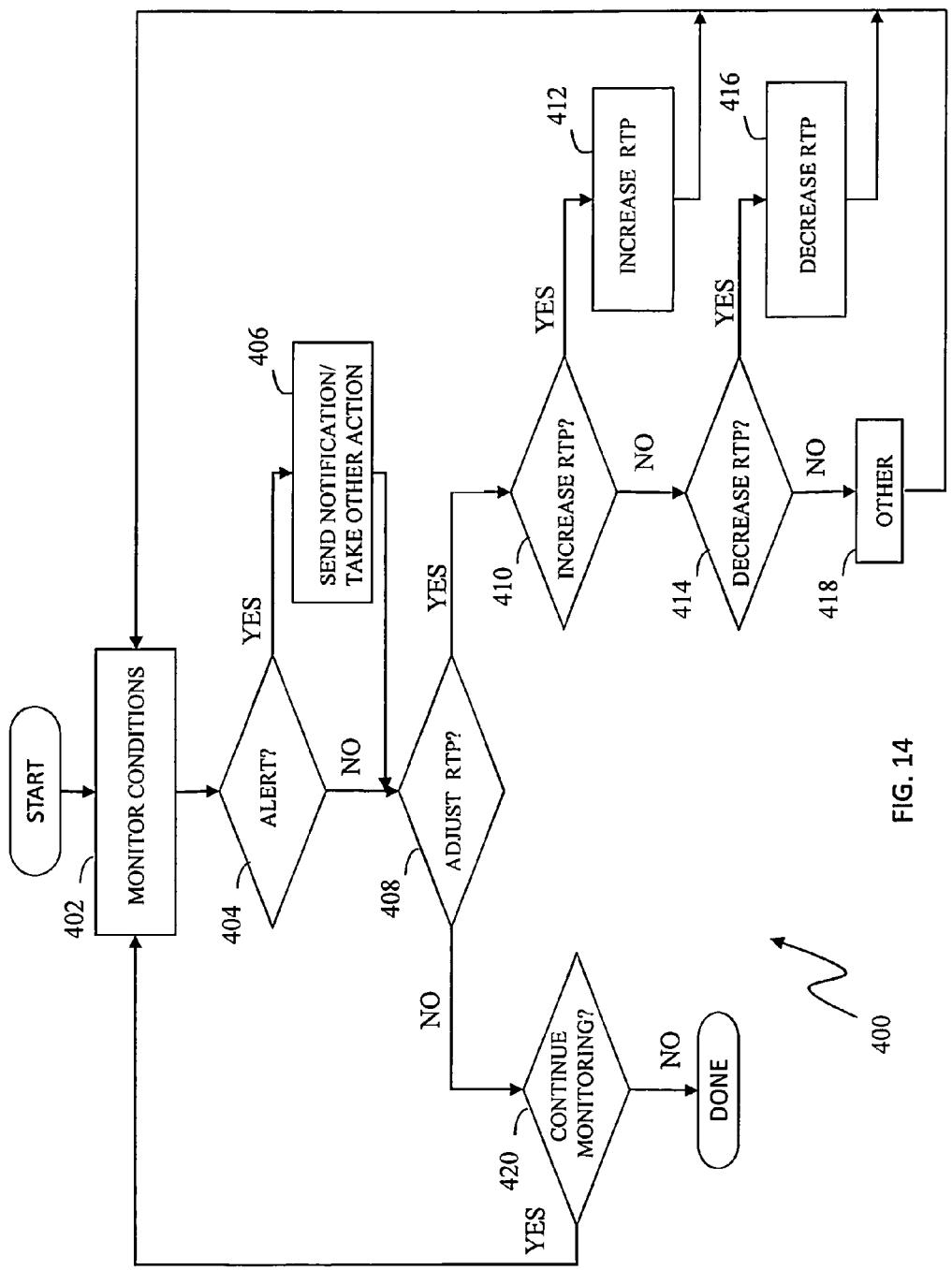
FIG. 14 is a flow diagram showing a general write pacing algorithm that increases or decreases RTP in response to current conditions according to an embodiment of the system described herein.

FIG. 14 is a flow diagram 400 showing a general write pacing algorithm that increases or decreases RTP in response to current conditions according to an embodiment of the system described herein. The general write pacing algorithm may be used in connection with scheduled RTP increases or decreases scheduled in connection with the processing illustrated by the flow chart 350, may be used with other automatic changes in RTP, may be used in connection with manual (user specified) changes in RTP and/or in connection with any other appropriate situation where the RTP is being changed.

Processing begins at a step 402, where system conditions may be monitored, including network/storage device conditions and/or current lag times and RTP times of the system. Any appropriate systems (including internal system mechanisms) may be used for monitoring and analyzing network activity and conditions and/or parameters of writing to storage devices, including conventional systems. After the step 402, processing proceeds to a test step 404 where it is determined whether the system conditions indicate an alert level. For example, if the system is in a YELLOW or RED condition, as discussed herein, an alert may be triggered. If at the test step 404 it is determined that an alert threshold has been reached, then processing proceeds to a step 406 where a notification is sent concerning the alert and/or other remedial action is taken.

After the step 406, or after the test step 404 if no alert threshold has been reached, processing proceeds to a test step 408 where it is determined whether the RTP should be adjusted. The RTP may be adjusted based on the network/storage device conditions and/or in response to a desire to fine tune the write pacing of the system. A decision to adjust the RTP may be made manually by a user or may be made automatically based on, for example, set threshold values of allowed lag times. See, for example, the flow chart 350 and corresponding discussion. If at the test step 408 it is determined that the RTP should be changed, then processing proceeds to a test step 410 where it is determined if the RTP should be increased. By increasing the RTP, the lag time may be decreased. If at the test step 410, it is determined that the RTP should be increased then processing proceeds to a step 412 where the RTP is increased in the system by an appropriate amount (e.g., a previously-specified amount, an amount determined by a particular metric or set of metrics, etc.). After the step 412, processing proceeds back to the step 402.

If at the test step 410, it is determined that the RTP should not be increased, then processing proceeds to a test step 414 where it is determined whether the RTP should be decreased. By decreasing the RTP, the lag time may be increased. If at the test step 414, it is determined that the RTP should be decreased, then processing proceeds to a step 416 where the RTP is decreased in the system by an appropriate amount (e.g., a previously-specified amount, an amount determined by a particular metric or set of metrics, etc.). After the step 416, processing proceeds back to the step 402. If at the test step 414, it is determined that the RTP should not be decreased, then processing may proceed to a step 418, where, for example, an adjustment to another part of the system may be implemented that causes a change in the RTP, for example, a controlled or expected change in the network/storage device conditions that causes a change in current system operation to a different contour line and, accordingly, causes a change in the RTP. After the step 418, processing proceeds back to the step 402.

If at the test step 408, it is determined that the RTP should not be adjusted, then processing proceeds to a test step 420 where it is determined whether monitoring of the system is to be continued. If monitoring is to be continued, then processing proceeds to the step 402. Otherwise, processing is complete. Note that although processes for issuing alerts and notifications may be described in conjunction with the write pacing processes detailed herein, the alert and notification procedures may instead be performed and controlled separately from the write pacing processes described herein.

Figure 15:
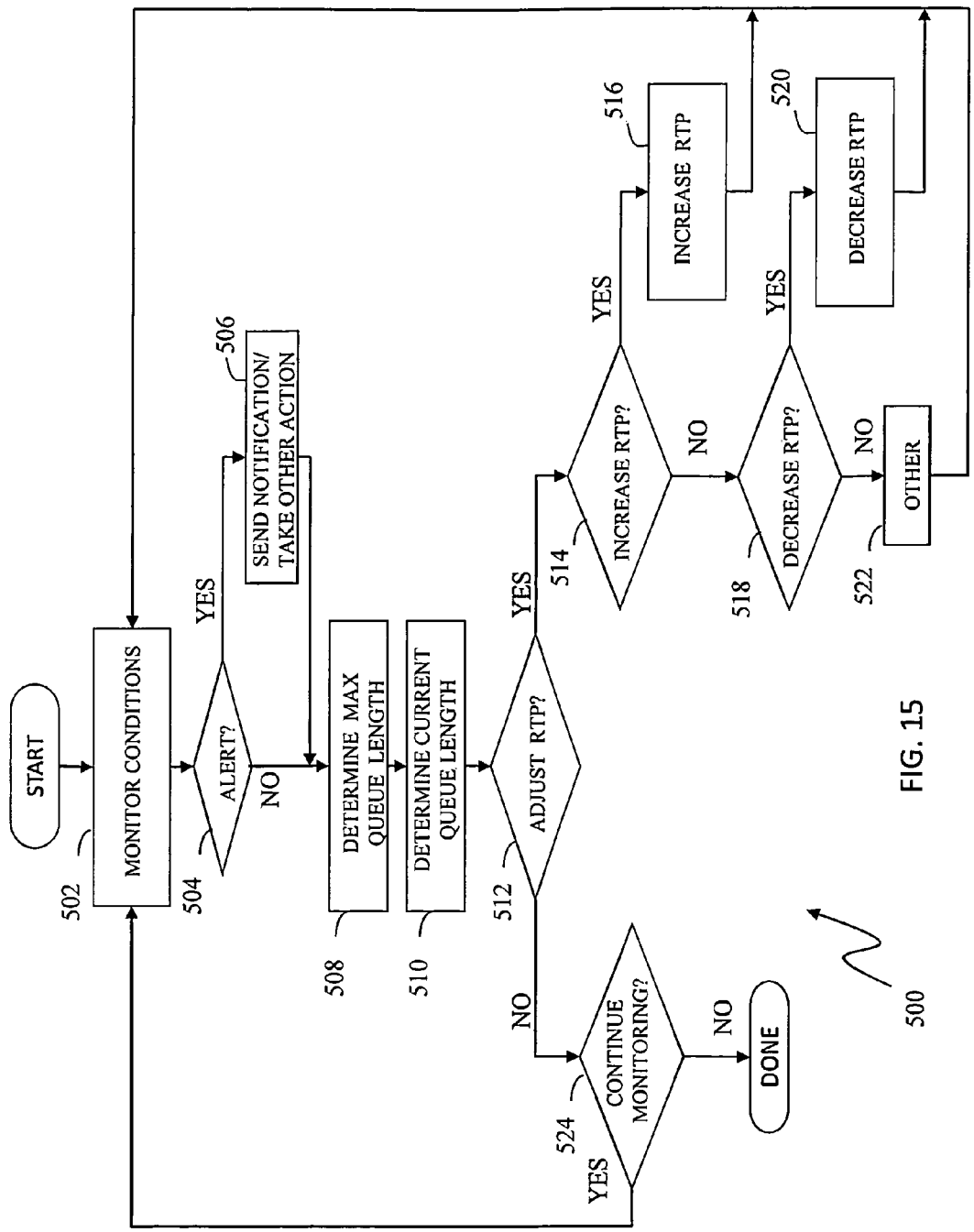
FIG. 15 is a flow diagram showing write pacing with adjustment of the RTP based on queue length according to another embodiment of the system described herein.

FIG. 15 is a flow diagram 500 showing write pacing with adjustment of the RTP based on queue length according to another embodiment of the system described herein. At a step 502, system conditions may be monitored, including network/storage device conditions and/or current lag times and RTP times of the system, among other appropriate system conditions used for write pacing in accordance with the system described herein. Appropriate mechanisms may be used for monitoring and analyzing network activity and conditions and/or parameters of writing to storage devices, as further discussed elsewhere herein. After the step 502, processing proceeds to a test step 504 where it is determined whether the system conditions indicate an alert level. For example, if the system is in a YELLOW or RED condition, an alert may be triggered. If at the test step 504 it is determined that an alert threshold has been reached, then processing proceeds to a step 506 where a notification is sent concerning the alert and/or other remedial action is taken.

After the step 506 or after the test step 504 if no alert threshold has been reached, then processing proceeds to a step 508 where a maximum queue length is determined. The maximum queue length may be a length beyond which an unacceptable amount of lag time would occur. The maximum queue length may be the maximum amount of data that is stored in the N and N-1 cycle buffers in R1 shown, for example, in FIG. 3, that is waiting to be transferred to R2 and committed to the data element 62. The more data stored in the N and N-1 cycle buffers, the longer the lag time until the data is committed to the data element 62. Thus, the amount of data in the N and N-1 cycle buffers corresponds to the transfer rate of the data from R1 to R2. Accordingly, a maximum queue length can be determined that is based on a maximum acceptable amount of lag time determined according to the data transfer rate. It should be noted that, in various embodiments, the amount of data in the buffers may take into account data stored in the cache spillover slot, and may be used in connection with determining processing backlogs, as further discussed elsewhere herein. Thus, determinations of the RTP and/or lag time for suitable operation of the system described herein may be made according to the evaluations of data amounts stored in the N and N-1 cycle buffers and the cache spillover slot, as appropriate.

After the step 508, processing proceeds to a step 510 where the current queue length is determined. Processing then proceeds to a test step 512 where it is determined whether the RTP should be changed. The determination at the test step 512 depends on a comparison of the current queue length to the maximum determined queue length. If the current length of the queue is greater than the maximum queue length, then the determination may be to change the RTP and processing proceeds to a test step 514 where it is determined if the RTP should be increased. If so, then processing proceeds to a step 516 where RTP is increased by an appropriate amount (e.g., a previously-specified amount, an amount determined by a particular metric or set of metrics, etc.). By increasing the RTP, thereby increasing the response time for the host writes (WRT), the queue length may be reduced by slowing data writes to the R1 device. For example, in connection with the system illustrated by FIG. 3, it is possible to slow down writes to the N cycle buffer in R1 while the N-1 cycle buffer in R1 continues to transfer data to the N-1 cycle buffer in R2. Note that increasing RTP may include (momentarily) stopping all data writes to the R1 device and thereby stopping all write acknowledgments to the host. After the step 516, processing proceeds back to the step 502.

If the current queue length is less than the maximum determined queue length, then at the test step 514 it may be determined that the RTP is not to be increased and processing then proceeds to a test step 518 where it is determined if the RTP should be decreased. If so, then processing proceeds to a step 520 where the RTP is decreased by an appropriate amount (e.g., a previously-specified amount, an amount determined by a particular metric or set of metrics, etc.). By decreasing the RTP, thereby decreasing the response time for the host writes (WRT), the queue length may be increased by allowing data writes more quickly to the R1 storage device. After the step 520, processing proceeds back to the step 502. If at the test step 518, it is determined that the RTP should not be decreased, then processing may proceed to a step 522, where, for example, an adjustment to another part of the system may be implemented that causes a change in the RTP and/or lag time, for example, a controlled or expected change in the network/storage device conditions that causes an operating change of the system to a different contour line and, accordingly, causes a change in the RTP. After the step 522, processing proceeds back to the step 502.

If at the test step 512, it is determined that the RTP should not be adjusted, then processing proceeds to a test step 524 where it is determined whether monitoring of the system is to be continued. If monitoring is to be continued, then processing proceeds to the step 502. Otherwise, processing is complete. Note that although processes for issuing alerts and notifications may be described in conjunction with the write pacing processes detailed herein, the alert and notification procedures may instead be performed and controlled separately from the write pacing processes described herein.

As further discussed elsewhere herein, in various embodiments of write pacing, in connection with processes for data writes between first and second devices (e.g., R1 and R2 devices) of a data storage system, write pacing may be provided by delayed in response to at least one of the first storage device and the second storage device having a backlog of data. The size of the backlog may be based on an amount of data in cache slots of the first or second storage devices and/or other data storage components of the first or second storage devices. Acknowledging of the writes may be delayed in response to the backlog being greater than a first predetermined amount, and in which the acknowledging is not delayed in response to: the backlog being less than a second predetermined amount and/or a rate of data transfer for recent data being less than or equal to an amount of the delay and/or data not having been recently delayed. The first predetermined amount may equal the second predetermined amount. The amount of the delay may be based on the lowest of: the front end data rate and/or the back end data rate, in which the front end data rate corresponds to a rate of data being transferred from the first storage device to the second storage device and the back end data rate corresponds to a rate at which data is stored at the second storage device. Reference is again made to U.S. patent application Ser. No. 12/924,544 to Mishra et al. that is further discussed elsewhere herein.

According to the system described herein, a tool and/or other system may be provided that simulates write pacing in connection with a requested operation for a storage system to allow an analysis of the effect of the requested operation on the storage system. In an embodiment, the storage system may be an RDF system operating in an asynchronous transfer mode (e.g., an SRDF/A system) and the requested operation may correspond to a snapshot copy operation of the R2 device while the SRDF/A system is operating. The system described herein provides for advantageously simulating write pacing that would occur as a result of the snapshot operation and/or other requested storage system operation. As further discussed elsewhere herein, the system may be used in connection with determining slow down conditions of the R2 volume, the R1 volume and/or any other component slow down which would trigger write pacing as a result of a requested operation. Accordingly, the system described herein enables simulation of a storage system to take into account an effect of write pacing and may be advantageously used to anticipate and/or other minimize or avoid operations at a particular time that would create undesired initiation of write pacing.

The write pacing simulation tool described herein may be provided in connection with a tool for simulating performance of one or more data storage systems, including an SRDF/A system. Suitable data storage system simulation tools that may be used include systems and methods like that disclosed in U.S. Pat. No. 7,292,969 to Aharoni et al., entitled "Method and System for Simulating Performance on One or More Storage Systems," and U.S. Pat. No. 7,392,360 to Aharoni et al., entitled "Method and System for Capacity Planning and Configuring One or More Data Storage Systems," which are both assigned to the assignee of the present application, EMC Corporation, and which are both incorporated herein by reference. Additionally, the system described herein may be used in connection with the systems and methods disclosed in U.S. patent application Ser. No. 12/807,943, filed Sep. 17, 2010 (also assigned to EMC Corporation), entitled "Techniques for Identifying Devices Having Slow Response Times," which is incorporated herein by reference and which provides techniques for identifying one or more data storage volumes, such as one or more logical volumes, exhibiting a performance problem, such as large response times including large lag times.

Figure 16:
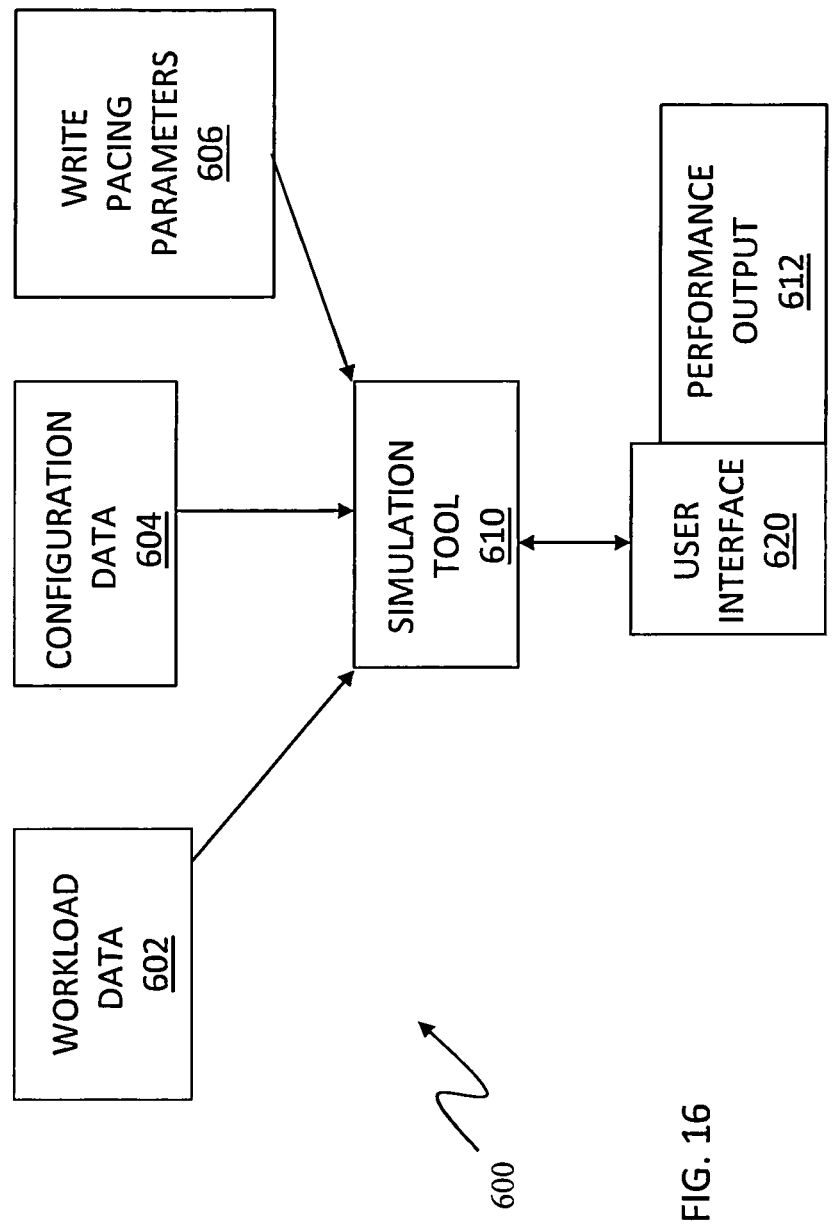
FIG. 16 is a schematic illustration of a system including a simulation tool according to an embodiment of the system described herein.

FIG. 16 is a schematic illustration of a system 600 including a simulation tool 610 according to an embodiment of the system described herein. The simulation tool 610 according to the system described herein may be include hardware and/or software components, including a computer readable medium storing executable code that is executable by one or more processors to perform described functions including receiving inputs and transmitting outputs like that further discussed elsewhere herein and including graphical outputs suitable for display to a user on one or more displays.

The simulation tool 610 may receive as inputs workload data 602, configuration data 604 and write pacing parameters 606. The workload data 602 may be based on performance data gathered about a data storage system. The configuration data 604 may include information describing the configuration of the data storage system. For example, the configuration data 604 may identify the different components included in the data storage system (e.g., type and number of physical drives or storage devices, number of DAs, number of FAs, which DAs and FAs (and ports thereof) are used to service I/Os for particular physical devices, which logical volumes (LVs) are stored on which physical devices, which is the data protection level (e.g., RAID 1, RAID 5, RAID 6, etc.) for different LVs, and the like.

An embodiment of the simulation tool 610 in accordance with techniques described herein may determine metrics from the workload data 602 for components of the data storage system and/or LVs described in the configuration data 604. The workload data 602 may be used by the simulation tool 610, for example, in determining a workload for one or more physical devices, logical devices or volumes (LVs) and the like. The workload may be expressed in terms of one or more different performance metrics, for example, in terms of I/O operations (e.g., I/O throughput such as number of I/Os/second, response time, and the like). Different performance metrics may be used, as appropriate, in characterizing the workload of the data system and/or one of its components, and the like. The workload data 602 and the configuration data 604 may include actual values, values input by a user and/or modeled values for this data, for example, using tools and techniques like that discussed in U.S. Pat. Nos. 7,292,969 and 7,392,360, further discussed elsewhere herein.

For example, workload data 602 may be provided by a workload analyzer (WLA) and/or other appropriate mechanisms or techniques, such as STP, SQL performance analyzer (SPA), host workloads etc., and/or via simulations thereof. Workload components considered may include, for example: Read Hit: Percentage of I/Os that reread data from cache Read Miss: Percentage of data that is read from disk in a random manner Sequential Read: Data that is read sequentially, and, therefore, is prefetched in relatively large blocks. Random Write: Percentage of I/Os that write data to a track not in cache Rewrite: Percentage of I/Os that write data to a write-pending track Sequential Write: Percentage of I/Os that write data sequentially, and, thus, give a chance to destage data in large blocks. In an embodiment, the workload data 602 may include information corresponding to a requested operation and/or other event on the data storage system. For example, in an embodiment, the requested operation may include a snap copy operation to be performed on R2 volume of an SRDF/A system. In other embodiments, other events and/or operations may be analyzed using the simulation tool 610 of the system described herein corresponding to various scenarios involving a slowdown of the R2 device. Examples of which may include a clone operation and/or an unbalanced SRDF/A configuration in which the R2 is slower than R1, for example, due to drives on the R2 being slower than on the R2 or the R2 having fewer DAs (back adaptors).

Additionally, in other embodiments, the simulation tool 610 of the system described herein may be used in connection with analysis for group level pacing operations in which write pacing operations occur for device groups as a result of link not being fast enough, for example. That is, group level pacing may occur for an RDF link being unable to sustain the host write workload, for example, either because there is not enough bandwidth or because there are not enough RAs. Accordingly, the system described herein may enable write pacing simulation resulting from multiple types of events that may cause a slowdown of one or more devices of a data storage system.

The write pacing parameters 606 may include threshold values for write pacing, including, for example, thresholds concerning data backlog in one or more data storage systems and/or lag times at one of more of the data storage systems that cause write pacing operations. The write pacing parameters 606 may also include performance characteristics, requirements and/or other appropriate information and processing characteristics concerning write pacing operations.

For example, parameters may be provided such as the amount of reduction of the I/O rates, including front end and back end rates, for initiated write pacing according to the system conditions and/or the amount of time for delaying an acknowledgement of a write to a host and/or to an R1 volume from an R2 volume (e.g., in an SRDF/A device) according to the features and techniques further discussed elsewhere herein. In some embodiments, the write pacing parameters 606 may be incorporated into the configuration data 604 that is input to the simulation tool 610.

The simulation tool 610 may perform processing such as, for example, simulation of performance and workload conditions based on a hypothetical change to a data storage system configuration (e.g., modification to the physical storage devices in a configuration such as adding new physical storage devices, removing a physical storage device, or changing a type of storage device, a reconfiguration of what DAs and/or FAs service I/O operations for a particular LV, movement of an LV's data to different physical storage device (s), and the like). The simulation tool 610 may also perform other processing used in connection with troubleshooting or identifying data storage system performance problems. The simulation tool 610 may output a performance output 612 that provides information on the simulated performance of one or more data storage systems, such as an SRDF/A system.

The simulation tool 610 may interact with a user via a user interface 620 on which may be provided or displayed the performance output 612. In an embodiment, the user interface 620 may be a graphical user interface that is capable of providing visual indicators such as graphs, maps and other displays, to the user concerning the performance output 612. The user may also make selections and provide input, such as using a keyboard, mouse, or other device of a computer system, based on the displayed information. As further discussed elsewhere herein, the simulation tool 610 may be implemented by executable code stored on a computer readable medium and executed by a processor. The simulation tool 610 may be provided on an external device, on one or more hosts and/or on one or more components of the data storage system.

Figure 17:
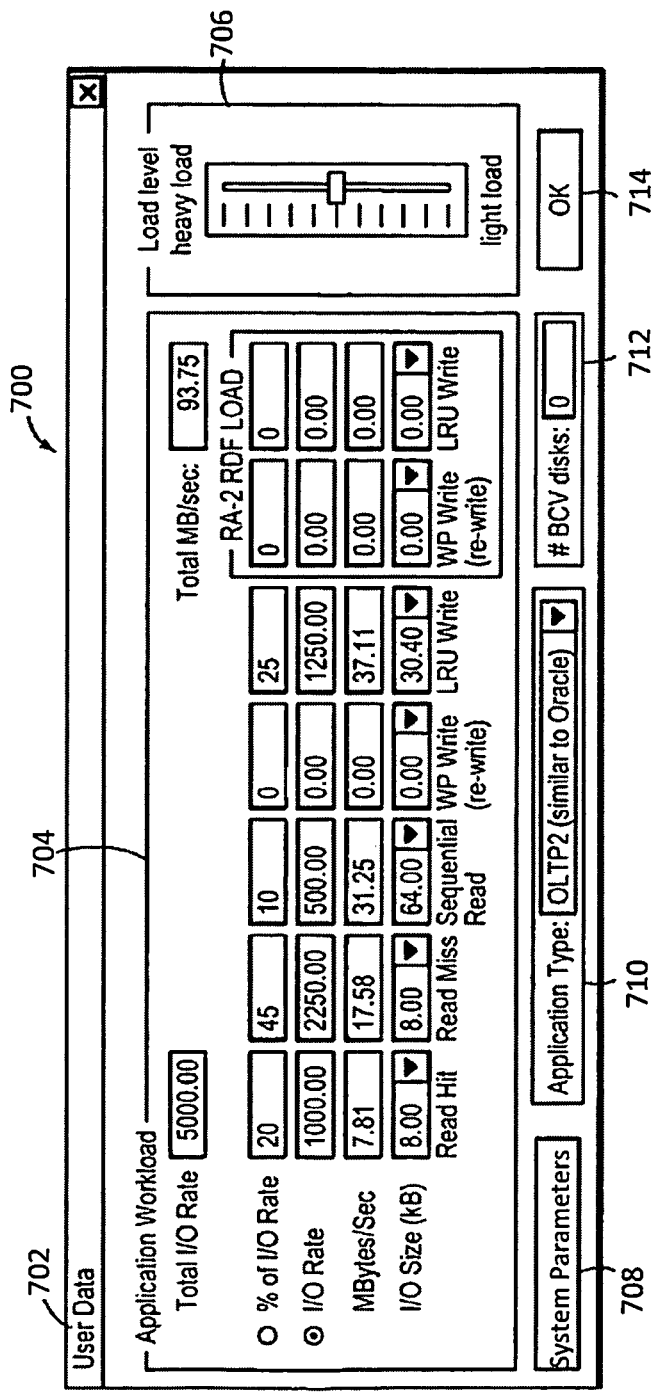
FIG. 17 shows an exemplary data input screen of the simulation tool according to an embodiment of the system described herein.

FIG. 17 shows an exemplary data input screen 700 of the simulation tool 610 according to an embodiment of the system described herein. A user data field 702 provides for input to be entered in the numerous data entry fields on a field-area 704. In the shown example the total I/O rate is 5,000 I/Os per second with a total transfer rate of 93.75 MB/sec rate available. For given I/O rate percentages the I/O rate is given and the resulting transfer data rate (MBytes/Sec) and I/O size (kB), and the conditions of read-hit, read-miss, sequential read, re-write, and LRU writes under such conditions, and the user may use the convenient toggle slider in field 706 to adjust workload level between a heavy and light load. The data of field 702 may correspond to parameters of a requested operation on the data storage system, such as a snap copy operation to be performed on an R2 volume. The user may then use a button 708 to input and/or otherwise download or enter desired data storage system parameters corresponding to a system being tested according to the techniques discussed herein. In fields 710 and 712, the user may input the application type and number of mirroring disks (BCV refers to business continuance volumes in the exemplary Symmetrix data storage system). If all input is OK the user may so indicate using field 714. In various embodiments, the information entered in the data input screen 700 may be automatically determined and entered according to retrieved parameters of a system under test, as further discussed elsewhere herein.

Figure 18:
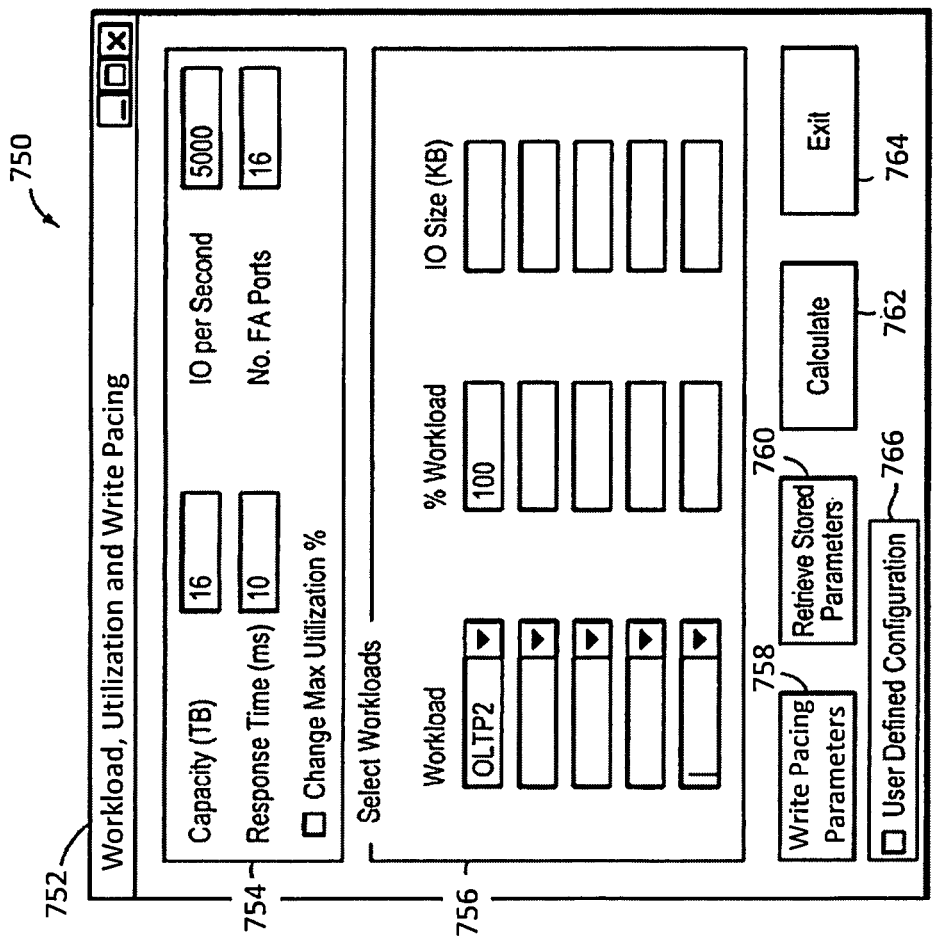
FIG. 18 is another example of another interface screen for the simulation tool according to an embodiment of the system described herein.

FIG. 18 is another example of another interface screen 750 for the simulation tool 610 according to an embodiment of the system described herein. The interface screen 750 may include a title field area 752 indicating consideration of workload, utilization are being considered. In field-area 754 the user may confirm the capacity, which in the example is 16 TB, the I/O per second of 5000, the acceptable response time of 10 ms, and no of front-end (FA) ports as 16. Maximum utilization may also be changed in this field-area. In field-area 756, workload may be selected, and parsed by application. In this example 100% of the workload may be attributed to the OLTP2 database application. As further discussed elsewhere herein, in other embodiments, workloads may be input using various components and/or techniques (e.g., WLA, STP, SPA, host workloads etc.). In an embodiment, write pacing parameters may be input and/or modified using a button 758 that provides for input by a user of parameters and/or input from another source, among other possible options for providing write pacing parameters. Further, stored parameters may be retrieved by clicking on the button 760. The user may choose to click "calculate" or "exit" by clicking buttons 762 and 764, respectively. Using a button 766, configuration information of the system may be input, for example, a user defined configuration of the storage system.

Figure 19:
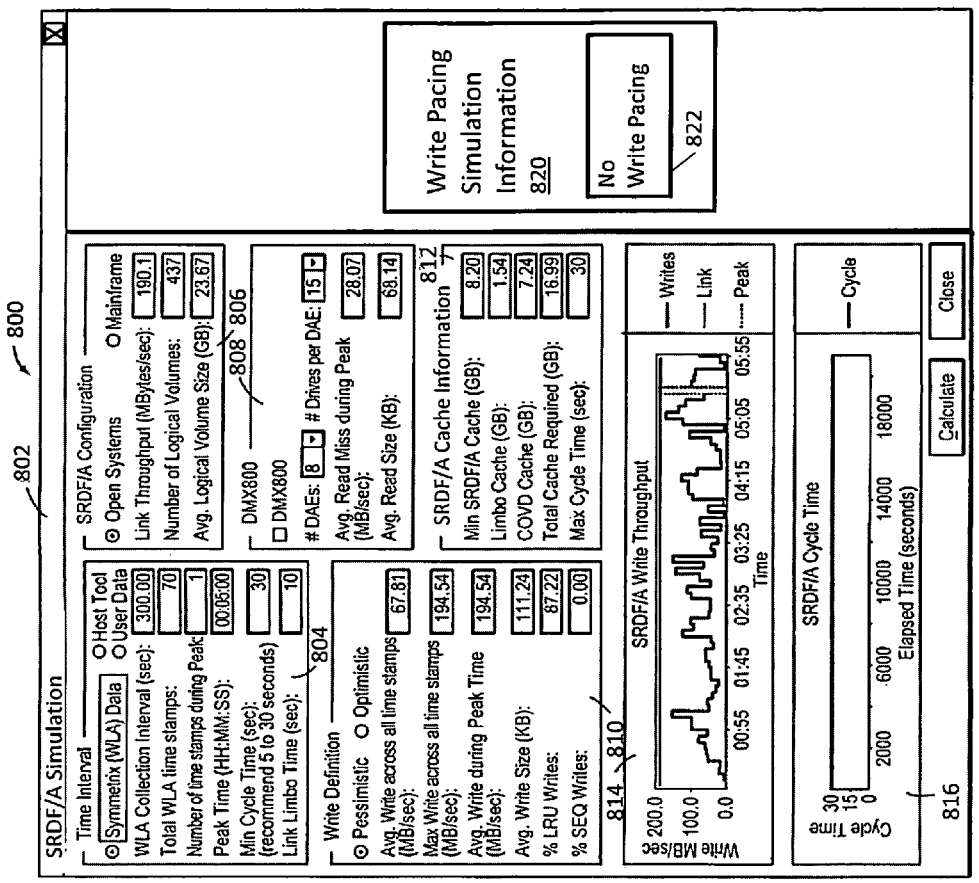
FIG. 19 shows an output display of a performance output of the simulation tool according to an embodiment of the system described herein.

FIG. 19 shows an output display 800 of a performance output 612 of the simulation tool 610 that is titled in field 802 as "SRDF/A Simulation" according to an embodiment of the system described herein. Field display areas 804, 806, 808, 810, 812, 814, 816 include, in respective ascending order: Time Interval, SRDF/A Configuration, DMX800, Write Definition, SRDF/A Cache Information, SRDF Write Throughput, and SRDF/A Cycle Time. This information shown in FIG. 19 is based on calculations made by the tool 610. The calculations may be made corresponding to a requested operation, such as a snapshot copy operation, as further discussed elsewhere herein. After reviewing the results, a user may enter or otherwise input new desired characteristics and then hit the Calculate button in the screen 800 display area to see results.

In field 804, a simulated bandwidth for the link between R1 (source) and R2 (target) is shown as being 190.1 MBytes/sec and this may be based on input to and determinations by the tool 610 according to the system described herein. The other data in this field may be determined using the input data (e.g., number of logical volumes and average logical volume size). Further, these values may be determined and/or input in connection with simulating effects of write pacing operations according to the given inputs according to the features discussed herein. In field 812, cache information may be based on the bandwidth available and inputted parameters. For example, the minimum amount of cache for SRDF/A may be recommended as 8.20 GB, and the total cache is 16.99 GB, meanwhile the cycle time will be 30 seconds (which is configurable). This cycle time is basically how far behind the input of a host write it is sent as I/O to a target across the link and depends on bandwidth. It is a function of an asynchronous environment that there will always be a lag time before the I/O is transferred and part of the consideration of such an environment. As further discussed elsewhere herein, the lag time may be determined and/or controlled based on the effect of write pacing operations.

Referring to field 814 and 816, it may be seen that the cycle time shown on the cycle graph (field 816) is constant at 30 seconds, and the write throughput varies according to workload show in field 814. Peak write rate (shown in dotted line) does not exceed the link throughput. Other fields shown in the embodiment, 802, 806, and 810, are outputs of the tool and may correspond to input data. The time interval in 802 may not change as the user varies bandwidth. In 808, information is given about a particular data storage system based on its configuration. The write definition shows among other things the average write during peak time, which at 194.54 is the peak in dotted line shown in field 814.

Field 820 shows an embodiment of write pacing simulation information providing details about simulated occurrences of write pacing operations that have occurred as a result of the a requested operation, and/or other event, on the data storage system under test according to the system parameters input for the simulation tool 610 according to the system described herein. As discussed, for the I/O operations and system parameters of the illustrated embodiment, the peak write rate does not exceed the link throughout of the system under test. Accordingly, the write pacing simulation information 820 may be a summary of simulated write pacing occurrences on the data storage system to perform the requested operation, e.g., snap copy operation, and/or in connection with another event that would cause a slowdown of one or more of the storage devices of the data storage system. As shown in the illustrated embodiment, the write pacing simulation information 820 may indicate in a section 822 that no write pacing operations would be initiated for the requested operation and/or other event for the system under test.

Figure 20:
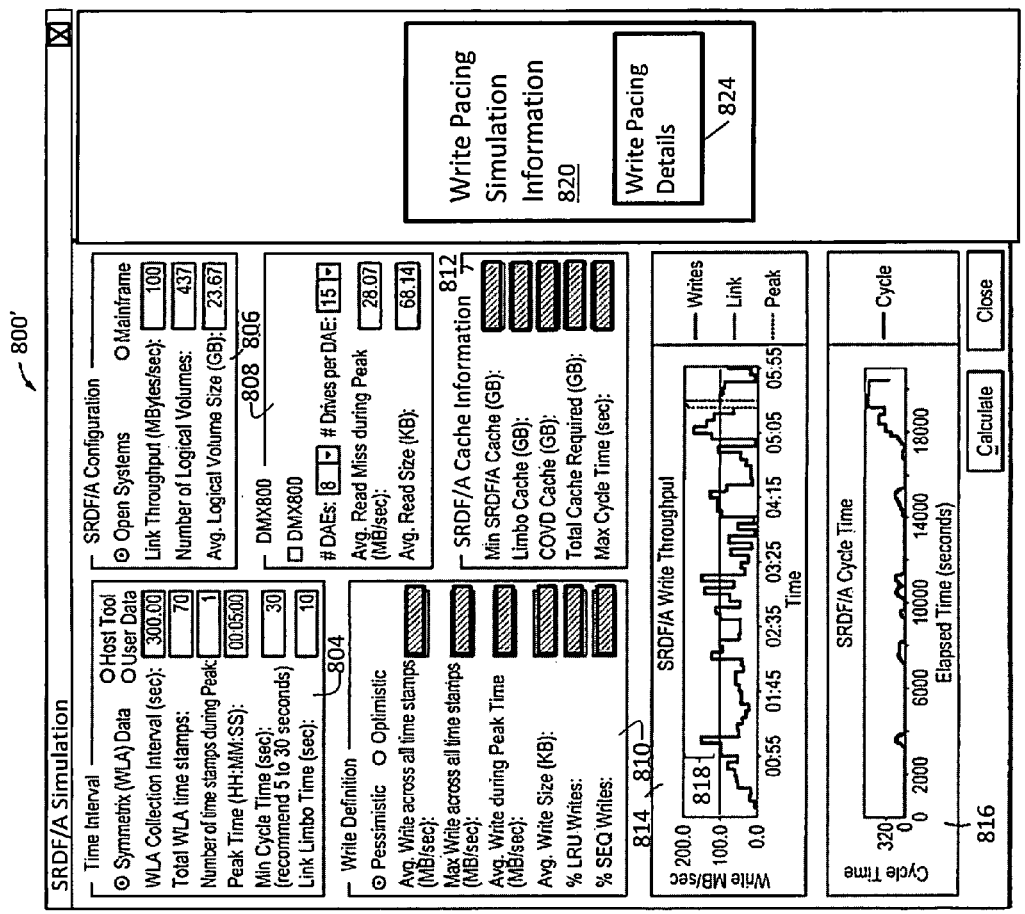
FIG. 20 shows output display of performance output according to another embodiment of the system described herein.

FIG. 20 shows an output display 800' of the performance output 612 according to another embodiment of the system described herein having similar components as discussed in connection with the display 800. In this example, in field 806, the available bandwidth of the system under test has been changed to 100 MBytes/sec and may correspond to the system under test which is experiencing a reduction in link throughout and/or to another system under test. In an embodiment, the field 812, the cache information may correspond to the amount of cache and cycle times with the initiating of write pacing operations. In such case, the amount of cache consumption may remain similar as in FIG. 19 and cycle time may decrease, in accordance with features of write pacing as further discussed elsewhere herein. It is noted that in other embodiments, the field 812 may additionally and/or alternatively include cache recommendations for cache and/or configuration information of the system that may avoid initiation of write pacing operations, for example, corresponding to proposed additional hardware and/or other components of the SRDF/A system.

It is seen in illustrative graphs shown in field 816 that the write throughput may be exceeded several times (not only during peak) for the simulated system, and is illustrated in field 814 with reference 818 where the write throughput rate exceeds the link throughput rate (e.g., 100 Mbytes/sec, as shown by a link throughput line in the field 814). Instances of the write throughout exceeding the link throughput rate of the system under test may correspond to determinations that write pacing operations may be required for the system under test having the current system configuration and parameters. Simulation information corresponding to the occurrence of write pacing may then be provided in the write pacing simulation section 820 that may be used in comparison with other information. Accordingly, in an embodiment, the information provided in the fields 814 and 816 may present a display corresponding to simulated throughput of a storage system without pacing that may be used in comparison with simulated write pacing information. The write pacing simulation information section 820 may then be provided that includes a section 824 providing details of the write pacing that may correspond to tabulated and/or graphical information provided to the user on the screen 800 about simulated write pacing occurrences for the requested operation, and/or other event, for the system under test having the identified system configuration and parameters, as further discussed elsewhere herein (see, e.g., FIG. 21).

It is further noted that, in various embodiments, the field 814 of the display 800' (as illustrated) may show cycle time increases for the system under test in the situation where write pacing is not initiated to provide for a simulated comparison of the SRDF/A system with and without write pacing. The write pacing information 820 may then include cycle time graphs, and/or other information, that corresponds to the simulated write pacing operations on the SRDF/A system, according to the embodiments set forth herein. Other comparisons between simulation of the SRDF/A system with and without write pacing may be provided by the simulation tool 610 in a manner configured as desired and appropriate for particular comparison and analysis situations of simulated SRDF/A systems. For example, in addition to the write pacing displays, the tool may further provide characteristics or recommendations for features of a system that would avoid the need for write pacing, such as cache recommendations etc., as provided in connection with an SRDF/A calculation tool or techniques like that further discussed elsewhere herein.

It is noted that the cycle time for a system using write pacing may be the same or shorter than when write pacing is not active. The field 810 of the display 800' may correspond to information reflecting the changes in I/Os resulting from write pacing. In particular, for the same link throughput for a system performing write pacing, there will be fewer writes to pass and the R2 volume processes fewer I/Os, which leads to shorter cycle times. When write pacing is active, it is expected to get fewer writes and thus less cache will be used to storage those writes.

Accordingly, in connection with the write pacing simulation detail section 820, the display 800' may provide information that enables a comparison of information of the storage system among multiple scenarios. For example, the display may provide comparison information for scenarios of: a system having the current configuration and parameters without write pacing being initiated, a system having the current configuration and parameters in which write pacing is initiated, and a recommended system that would avoid write pacing under the inputted parameters, and/or any combination thereof. The display screen 800' of the simulation tool 610, showing information provided for a particular storage system, may be controlled as appropriate according to a desired analysis. For example, instead of providing information corresponding to system recommendations in connection enabling comparison of simulated systems, the display 800 may provide only information corresponding to an analysis of the write pacing simulation information for the particular system having the specifically-identified configuration and parameters.

Figure 21:
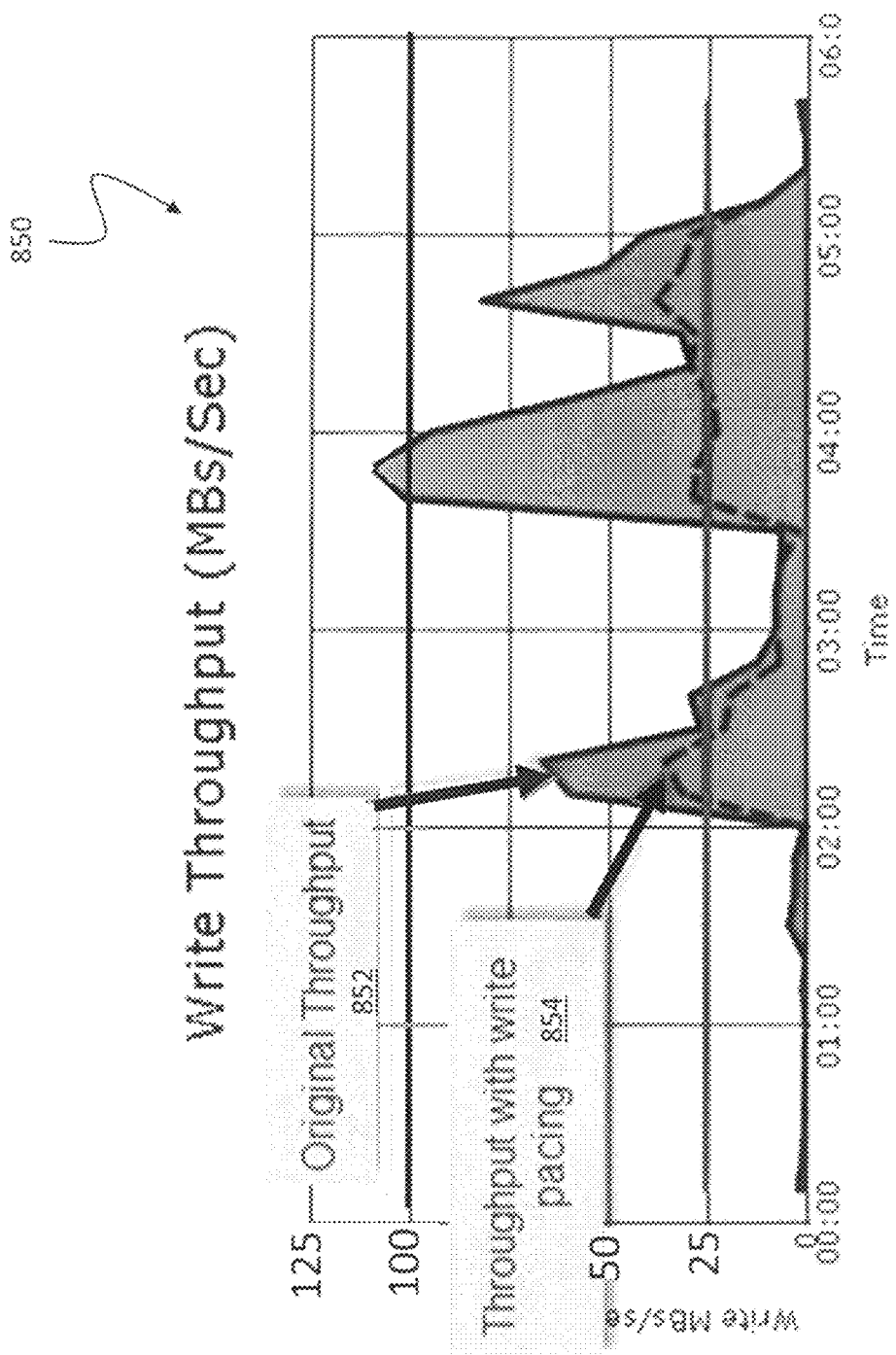
FIG. 21 is a schematic illustration of write pacing information that may be provided about simulated write pacing occurrences in accordance with an embodiment of the system described herein.

FIG. 21 is a schematic illustration of write pacing information 850 that may be provided about simulated write pacing occurrences in accordance with an embodiment of the system described herein. The write pacing information 850 may correspond to information shown in the section 824 of the write pacing simulation information 820. The illustration shows a comparison of original throughput 852 (i.e. without write pacing) of a simulated system and throughput with write pacing 854, shown by a dashed line, as simulated according to the system described herein. As illustrated, the simulation shows that the throughput with activated write pacing 854 has been significantly reduced compared to the original throughout 852. As further discussed elsewhere herein, workload data may be used in determining whether one or more devices (e.g., the R1 device) of the SRDF/A system need to be slowed down. In such a case, determinations as to how much the R1 device should be slowed down by write pacing may be determined according to write pacing parameters, such as host response time, as further discussed elsewhere herein.

Figure 22:
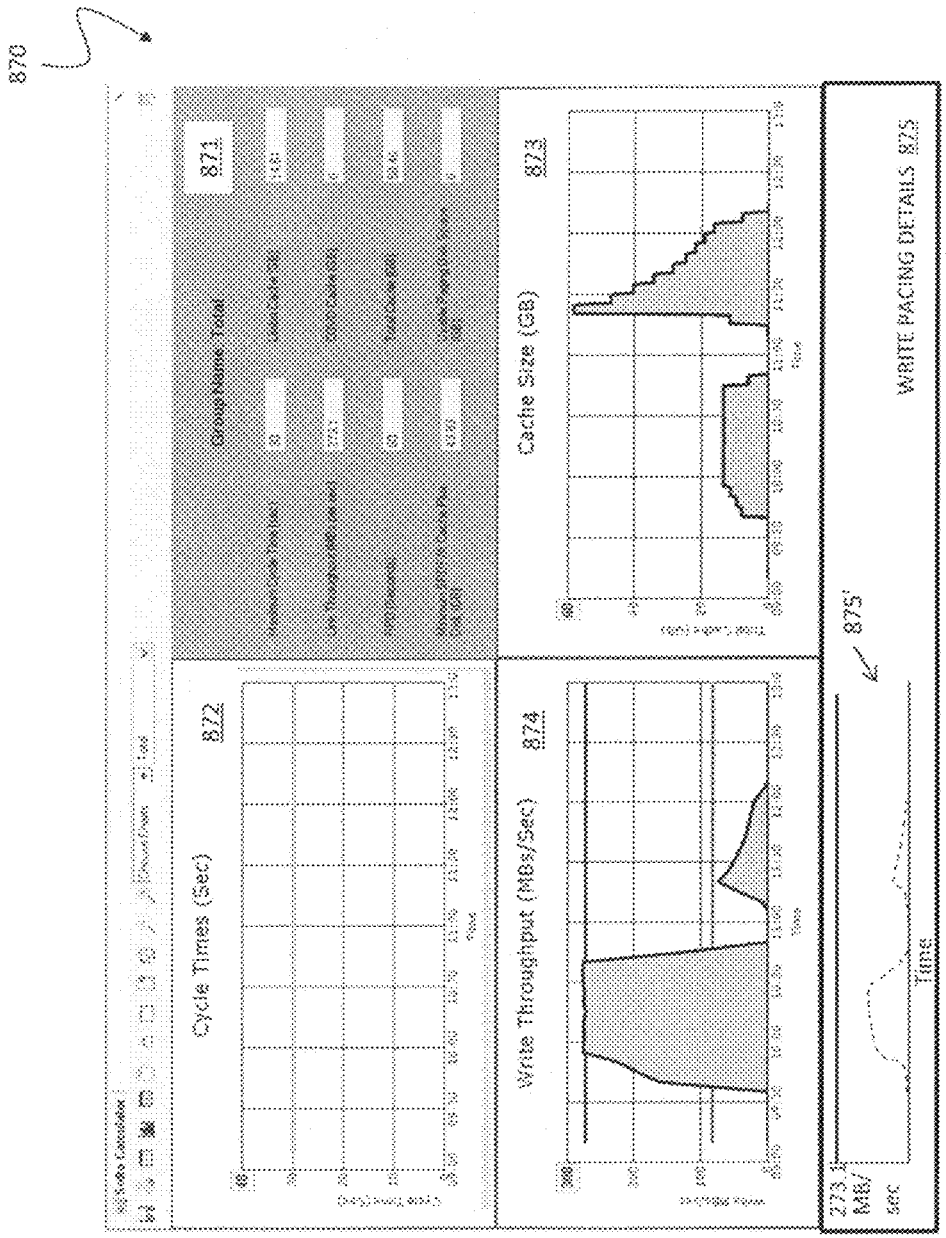
FIG. 22 is a schematic illustration showing a display screen of the simulation tool according to another embodiment of the system described herein.

FIG. 22 is a schematic illustration showing a display screen 870 of the simulation tool 610 according to another embodiment of the system described herein. Section 871 shows information input and/or extracted concerning a system under test, such as an SRDF/A system, having, for example, a link throughput of 273.1 Mb/sec and corresponding to a particular workload for a copy operation and/or other event on the system under test. Sections 872, 873 and 874, show, respectively, information concerning cycle times, cache size and write throughput for the system under test (i.e., without write pacing). As illustrated in the write throughput section 874, for the operation being performed, data throughout may be limited by the link throughput of the system and indicate that write pacing will occur according to the simulation. Section 875 may then be provided showing simulated write pacing details for a system like that shown in which write pacing occurrences are simulated according to an embodiment of the system described herein. As illustrated, for example, the write pacing details 875 may provide graphical and/or other information 875' illustrating the reduction in throughput resulting from the write pacing occurrences for the simulated operation or other event that is being simulated on the system under test according to the system described herein in connection with the analysis and evaluation of expected write pacing occurrences for the system.

Accordingly, the simulation tool 610 enables evaluation of a simulation of a request operation, such as a snapshot copy operation, and/or other event causing a slowdown of one or more of the storage devices of a system, such as an SRDF/A system, having identified parameters. The tool 610 enables a determination of the effect of the requested operation on processing characteristics of a write pacing operation that would be required to service the requested operation while the system (SRDF/A) is performing other processing operations in accordance with normal operations of the system. In situations where a user desires to minimize or avoid occurrences of write pacing, the user may use the tool 610 to simulate and thereby determine whether and to what extent write pacing will occur for the requested operation and/or other event on the identified system being simulated.

Figure 23:
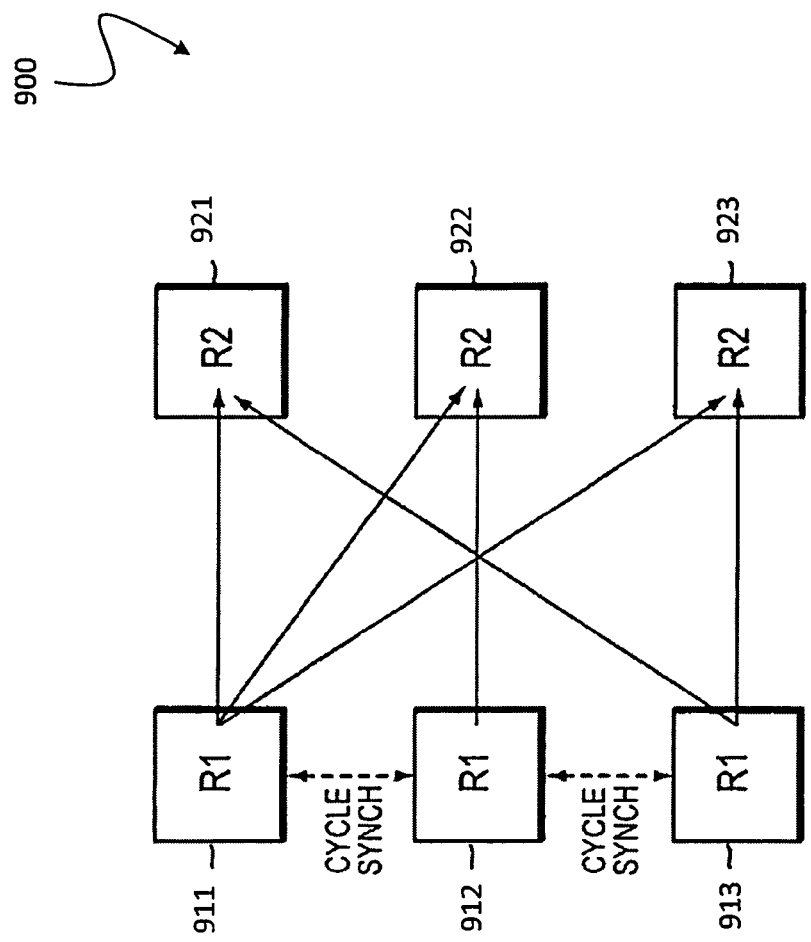
FIG. 23 is a schematic illustration showing a multi-box replication environment in which there are a plurality of data storage systems that are sources and another plurality that are targets.

FIG. 23 is a schematic illustration showing a multi-box replication environment 900 in which there are a plurality of data storage systems that are sources and another plurality that are targets, and in which, for example, one source may have many targets. R1 sources 911, 912, 913, each may have more than one R2 target 921, 922, 923. For example, R1 911 a source has target R2s 921-923. Nevertheless, each R1 may aligned or in synch with cycles with each other R1 and may be compensated for by tool 610 for performance simulation according to the system described herein. Accordingly, the system described herein may be used in connection with multi-device storage systems.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for simulating write pacing, comprising:
receiving input corresponding to at least one of: a configuration and a workload of a data storage system;
receiving input corresponding to an event on the data storage system;
receiving input corresponding to write pacing parameters of the data storage system;
simulating processing of the data storage system that is required in connection with the event on the data storage system; and
determining processing characteristics of a write pacing operation according to the write pacing parameters during the simulated processing of the data storage system during the event, wherein the data storage system includes a first storage device and a second storage device and wherein the first storage device replicates data to the second storage device asynchronously and wherein the write pacing operation includes controlling a write response time between when a write request is received and when the write request is acknowledged by the first storage device, and wherein the write response time is controlled according to the write pacing parameters.

2. The method according to claim 1, further comprising: displaying results of the simulated processing.

3. The method according to claim 1, wherein the event includes a snap copy operation being performed on the second storage device of the data storage system.

4. The method according to claim 1, wherein the write pacing parameters correspond to an amount of lag time between when previous write requests were acknowledged by the first storage device and when corresponding data is committed at the second storage device.

5. The method according to claim 1, wherein the write pacing parameters correspond to a backlog of data, and wherein the acknowledging of the write request is delayed in response to at least one of the first storage device and the second storage device having the backlog of data.

6. The method, according to claim 5, wherein a size of the backlog is based on an amount of data in cache slots of the at least one of the first storage device and the second storage device.

7. A non-transitory computer readable medium storing software for simulating write pacing, the software comprising:
executable code that receives input corresponding to at least one of: a configuration and a workload of a data storage system;

executable code that receives input corresponding to an event on the data storage system;

executable code that receives input corresponding to write pacing parameters of the data storage system;

executable code that simulates processing of the data storage system that is required in connection with the event on the data storage system; and executable code that determines processing characteristics of a write pacing operation according to the write pacing parameters during the simulated processing of the data storage system during the event, wherein the data storage system includes a first storage device and a second storage device, and wherein the first storage device replicates data to the second storage device asynchronously and wherein the write pacing operation includes controlling a write response time between when a write request is received and when the write request is acknowledged by the first storage device, and wherein the write response time is controlled according to the write pacing parameters.

8. The non-transitory computer readable medium according to claim 7, further comprising:

executable code that displays results of the simulated processing.

9. The non-transitory computer readable medium according to claim 7, wherein the event includes a snap copy operation being performed on the second storage device of the data storage system.

10. The non-transitory computer readable medium according to claim 7, wherein the write pacing parameters correspond to an amount of lag time between when previous write requests were acknowledged by the first storage device and when corresponding data is committed at the second storage device.

11. The non-transitory computer readable medium according to claim 7, wherein the write pacing parameters correspond to a backlog of data, and wherein the acknowledging of the write request is delayed in response to at least one of the first storage device and the second storage device having the backlog of data.

12. The non-transitory computer readable medium according to claim 11, wherein a size of the backlog is based on an amount of data in cache slots of the at least one of the first storage device and the second storage device.

13. A simulation system, comprising:

a data storage system including a first storage device and a second storage device coupled to the first storage device, wherein the first storage device replicates data to the second storage device asynchronously; and at least one processor that executes software stored on a computer readable medium to perform steps of:

receiving input corresponding to at least one of: a configuration and a workload of the data storage system;

receiving input corresponding to an event on the data storage system;

receiving input corresponding to write pacing parameters of the data storage system;

simulating processing of the data storage system that is required in connection with the event on the data storage system; and determining processing characteristics of a write pacing operation according to the write pacing parameters during the simulated processing of the data storage system while performing the operation, wherein the write pacing operation includes controlling a write response time between when a write request is received and when the write request is acknowledged by the first storage device, wherein the write response time is controlled according to the write pacing parameters.

14. The system according to claim 13, wherein the processor executes the software to further perform:

displaying results of the simulated processing.

15. The system according to claim 13, wherein the event includes a snap copy operation being performed on the second storage device of the data storage system.

* * * * *